US012811289B2

(12) United States Patent
Yang et al.

(10) Patent No.: US 12,811,289 B2
(45) Date of Patent: Nov. 24, 2026

(54) APPARATUS AND DEVICES TO REDUCE ELECTROMAGNETIC INTERFERENCE FOR SHORT-RANGE WIRELESS INTERCONNECTIONS

(71) Applicant: Intel Corporation, Santa Clara, CA (US)

(72) Inventors: Tae Young Yang, Portland, OR (US); Zhen Zhou, Chandler, AZ (US); Shuhei Yamada, Hillsboro, OR (US); Tolga Acikalin, San Jose, CA (US); Kenneth P. Foust, Beaverton, OR (US); Bryce D. Horine, Portland, OR (US)

(73) Assignee: INTEL PRODUCTS IP LLC, Santa Clara, CA (US)

( * ) Notice: Subject to any disclaimer, the term of this patent is extended or adjusted under 35 U.S.C. 154(b) by 95 days.

(21) Appl. No.: 18/147,768

(22) Filed: Dec. 29, 2022

(65) Prior Publication Data

US 2024/0222859 A1 Jul. 4, 2024

(51) Int. Cl.

| | |
|---|---|
| ***H01Q 1/52*** | (2006.01) |
| ***H01Q 1/22*** | (2006.01) |
| ***H01Q 15/00*** | (2006.01) |
| ***H01Q 17/00*** | (2006.01) |
| ***H01Q 19/10*** | (2006.01) |

(52) U.S. Cl.

CPC ........... *H01Q 1/526* (2013.01); *H01Q 1/2291* (2013.01); *H01Q 17/00* (2013.01); *H01Q 19/10* (2013.01)

(58) Field of Classification Search

None

See application file for complete search history.

(56) References Cited

U.S. PATENT DOCUMENTS

| | | | | |
|---|---|---|---|---|
| 2017/0033468 | A1* | 2/2017 | Wong | H01P 1/2005 |
| 2020/0185342 | A1* | 6/2020 | Dalmia | H01Q 1/2283 |
| 2022/0199556 | A1* | 6/2022 | Zhou | H01Q 1/2283 |
| 2023/0420396 | A1* | 12/2023 | Acikalin | H01Q 1/2283 |

* cited by examiner

*Primary Examiner* — Anh Q Tran

(74) *Attorney, Agent, or Firm* — Viering, Jentschura & Partner mbB

(57) ABSTRACT

An apparatus may include a substrate including: a first antenna configured to form a first short range wireless interconnection with a first antenna of a further substrate, a second antenna spaced apart from the first antenna, the second antenna is configured to form a second short range wireless interconnection with a second antenna of the further substrate, and a metamaterial configured to form a surface with effective negative permeability within a space formed between a surface of the substrate and a surface of the further substrate for an established short range wireless interconnection of the first short range wireless interconnection and the second short range wireless interconnection.

23 Claims, 16 Drawing Sheets

APPARATUS AND DEVICES TO REDUCE ELECTROMAGNETIC INTERFERENCE FOR SHORT-RANGE WIRELESS INTERCONNECTIONS

TECHNICAL FIELD

Various aspects of this disclosure relate to reducing and/or blocking electromagnetic interference between entities forming short-range wireless interconnections.

BACKGROUND

Metamaterials are artificial materials that are engineered to have properties which cannot not be found in nature. Generally, metamaterials being structures that are made by combining a number of smaller structures, which may be referred to as unit cell, in a repeating pattern. Each unit cell may interact with electromagnetic waves in a particular way. Through the interactions, the resulting material may provide certain properties which cannot be found in naturally occurring materials. Such properties may include negative refraction, superconductivity, and cloaking. Through such properties, metamaterials may control the flow of electromagnetic waves. For example, some metamaterials are designed to absorb electromagnetic waves, while others are designed to reflect them.

Metamaterials may be employed in a wide range of potential applications, in particular in technology areas including telecommunications and medicine. Metamaterials have been used to develop antennas with enhanced performance in long-range wireless communication. It may be desirable to employ metamaterials in short-range wireless communication to reduce electromagnetic interference. Particular applications may include wireless chip-to-chip communication or connectors.

BRIEF DESCRIPTION OF FIGURES

In the drawings, like reference characters generally refer to the same parts throughout the different views. The drawings are not necessarily to scale, emphasis instead generally being placed upon illustrating the principles of the disclosure. In the following description, various aspects of the disclosure are described with reference to the following drawings, in which.

DESCRIPTION

Figure 1:
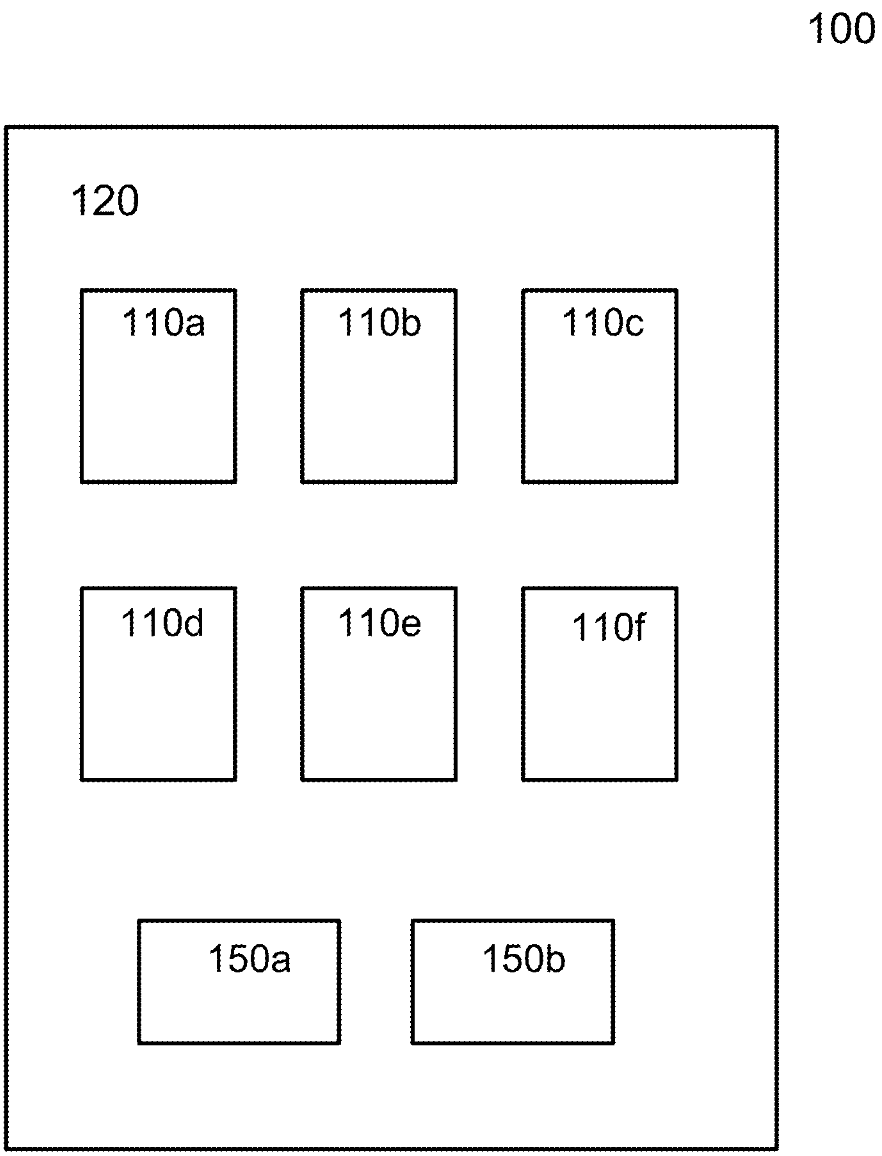
FIG. 1 shows a simplified representation of a multichip electronic device.

Artificial materials may be designed and used in consideration with specific properties, such that certain properties may be manipulated to provide or mimic the properties that are not found in naturally occurring materials. Such artificial materials may include engineered materials and/or metamaterials. In its broader representation, engineered materials can be any type of material that is intentionally designed and fabricated for a specific purpose. On the other hand, metamaterials are specifically designed to interact with electromagnetic waves, such as radio waves, microwaves, and light, in unusual ways. Metamaterials may usually include metallic or dielectric structures that are smaller than the wavelength of target electromagnetic waves, and they can be engineered to have negative refractive index, superconductivity, or other unusual properties.

In accordance with various aspects provided in this disclosure, interference reducing and/or blocking methods are provided via use of metamaterials. A metamaterial may form a surface that does not allow electric fields incident to the normal direction of the surface from a side to pass to the other side, at least partially. The surface may have an effective negative permeability, and accordingly may also be referred to as a "metasurface". Such formed surface(s) may create an invisible vertical wall (e.g. when metamaterial, such as AMC structure lies in the horizontal plane, i.e. ground plane and metallic plate lie in the horizontal plane) without the physical form. The formed invisible vertical wall may reflect the incident electric fields, or may absorb by providing a "cloak" effect.

Some aspects provided herein may relate to the use of metamaterials in applications which require electromagnetic interference/radio frequency interference (EMI/RFI) shielding and/or improve isolation between electromagnetic radiators, which can be exemplified via use of a connector for data communication within this disclosure. Some aspects provided herein may relate to the use of metamaterials in wireless chip-to-chip communication. In some aspects, at least some of chips in exemplified structures may include radio frequency integrated circuits (RFICs). Through aspects provided herein, RFICs may be shielded against EMI/RFI.

Chip-to-chip communication relates to exchange of data between two or more integrated circuits or chips. Traditionally, chip-to-chip communication involved use of wired interconnects between chips, but with recent developments in respective technology areas, multiple chips in a device may communicate with each other via wireless chip-to-chip interconnects. Short-range wireless communication technologies, such as Wi-Fi, Bluetooth, Zigbee, NFC, may be used for communication. In various aspects, capacitive coupling may be used to convey data. In order to transmit signals using capacitive coupling, chips must be designed with the necessary capacitive coupling elements, such as metal pads, plates, or vias. When an electrical signal is applied to one of the chips, the electrical charges on the capacitive coupling elements will be accelerated, and the electrical signal is detected at the other chip through the electrical capacitive electromagnetic coupling between the two devices. Capacitive coupling may include several advantages over other methods of wireless chip-to-chip communication, such as the ability to support efficient broad operational bandwidth (e.g. more than 40% fractional bandwidth) and the ability to transmit high data throughputs (e.g. more than 150 Gbps for D-band case).

To meet the computational demands for today's application, chips or modules or chipsets that include and integrate multiple disaggregated resources are used. One way to increase the performance or power of a processor is to increase the computational elements or transistors on the processor. However, as the size of transistors has shrunk, the transistor doubling frequency noted in Moore's Law industry has decelerated, thereby limiting the usefulness of this strategy. One alternative to boost performance has been the use of aggregated heterogeneous chiplets.

Some aspects provided herein may include use of chiplets, some of which are in general applicable for chips or integrated circuits. As used herein, the term "chiplet" includes an integrated circuit block of a multichip module (MCM) or of MCM devices. A chiplet can be considered as a sub-processing unit or a disaggregated functional resource with a specialized function that is designed to integrate with other chiplets of a same multichip device or module. A chiplet may be fabricated on its own individual semiconductor die with physical dimensions that are often smaller than other chips or processors. The MCM unit provides interconnections of the chiplets so as to form complete electronic function(s).

In aspects of the disclosure, where appropriate, the term "die" may refer block of semiconductor material on which a component, e.g., a chip or chiplet is fabricated. In appropriate cases the term "die" may be used to refer to the integrated circuit fabricated from the semiconductor material (e.g., a chip, chiplet, etc.).

An MCM or MCM can be an electronic assembly that may be a single package including multiple components or modules or circuitries. In examples herein, an MCM can be a plurality of chiplets arranged in a single package including die-to-die interconnect schemes for connecting the chiplets. In such cases, the chiplets of an MCM can be integrated and mounted onto a unifying substrate, so that in use it can be treated as if it were a larger IC. The unifying substrate may be the package carrier or package carrier substrate. The chiplets (and possibly other components) of the MCM may also share a common encapsulation and a common integrated heat spreader (IHS).

An MCM may in some cases include components other than chiplets. That is, an MCM may include integrated devices with their own packaging, such as, for example, central processing units (CPUs), graphics processing units (GPUs), field programmable gate arrays (FPGA), etc. These such components with their own packaging can be arranged on a common substrate or base layer within relatively close proximity to each other in the MCM.

As used herein, "racks" or "rack enclosures" may be any type of equipment for housing electronic equipment. Racks house multiple types or sets of electronic equipment with an individual set of electronic equipment being housed within a single rack unit of the rack. Rack units of a rack may be stacked closely together, e.g., vertically in some cases. In aspects of the present disclosure, a rack unit may contain or hold one or more circuit boards or simply "boards". Each board can include a plurality of electronic devices, e.g., chips, chiplets, one or more multichip devices mounted the board. A rack may include multiple rack units that may be enclosed or contained in a common frame structure or chassis.

As used herein, "an antenna" may be any type of radio antenna for transmission or reception of electromagnetic waves in a wireless communication relationship with a respective further antenna. An antenna may be an RF antenna configured to communicate with a further RF antenna via radio waves. An antenna may be a capacitive coupler configured to communicate with a further capacitive coupler via capacitive coupling principles. An antenna may be an inductive coupler configured to communicate with a further inductive coupler via inductive coupling principles.

FIG. 1 shows a simplified representation of a multichip electronic device 100. The device 100 includes a plurality of chiplets 110*a-f*. Each of the chiplets 110*a-f* may include one or a plurality of processor-cores or cores. In addition to the chiplets 110*a-f*, the electronic device 100 may include other hardware and/or software resources as represented by the blocks 150*a* and 150*b*. For example, the electronic device 100 may include elements or components such as, for example, processors (e.g., CPU, GPU, AI engine, etc.), random access memory (RAM), read-only memory (ROM), erasable programmable ROM (EPROM), electrically erasable programmable ROM (EEPROM), application specific integrated circuit (ASIC), etc.), software, hardware, and/or firmware.

The device 100 may include a base layer or a substrate 120 for mounting, on which the chiplets and other components can be mounted. In some cases, the substrate 120 may be a printed circuit board (PCB), including wired connections between the components, e.g., wired connections between the chiplets and wired connections for the resources 150*a-b*.

The device 100 of FIG. 1 can be considered as a 2D (two-dimensional) device because the components the mounted on a single plane. However, the above approach may be of less value because area of the mounting plane (e.g., real estate) may be not sufficient to allow enough components for a particular application. Further, the connections of a base layer like a PCB (e.g., conductive traces) may be unsuitable for applications requiring fast interconnections.

Figure 2:
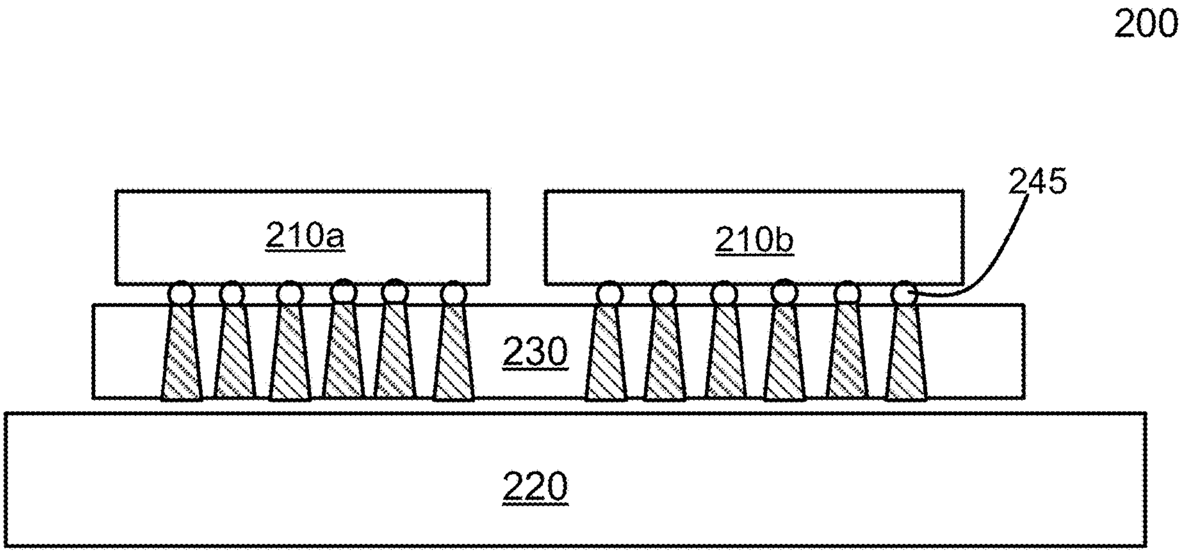
FIG. 2 shows a module device as an example of a 2.5D heterogeneous integration of integrated circuits or components.

Another architectural approach for increasing computational power is the use of 2.5 dimensional (2.5 D) packages. One example of a 2.5D package is shown in the device 200 of FIG. 2. 2.5D packages, as known in the art, can include multiple components, e.g., chips or chiplets mounted on an interposer. Conventionally, 2.5D semiconductor packages place several or chips side-by-side on a silicon interposer. This can be seen in FIG. 2, where in the device 200, the chips or chiplets 210*a* and 210*b* are mounted using bumps 245 on the interposer 230. The interposer itself can be mounted on the base layer, the package carrier, or the substrate 220.

An interposer is an electrical interface routing. For example, an interposer can provide interconnections between the components (e.g., chips, chiplets, etc.), as well as the external input/outputs (I/Os) through the use of through-substrate vias or through-silicon vias (TSV). Interposers can be silicon interposers that have lateral dimensions larger than the chips or components they are interconnecting.

Further, 2.5D package devices may also include bridges. For example, silicon bridges are a small piece of silicon that can be embedded under the edges of two components and provide interconnections therebetween. This can allow for most chips or components to be attached in multiple dimensions and thus eliminate additional physical constraints on heterogeneous chip attachment within the theoretical limits. In other words, an embedded multi-die interconnect bridge (EMIB) or bridges are essentially embedded into a standard packaging substrate and are used to provide high interconnect density exactly where needed, while the rest of a standard packaging substrate can be used for the rest of the interconnects.

Another architectural approach for improving devices is the use of three-dimensional (3D) stacking of semiconductor devices or components. The components (e.g., chips or chiplets) can be arranged in 3 dimensions instead of 2 dimensions. This allows the components of a device or module to be placed in closer proximity to one another.

Figure 3:
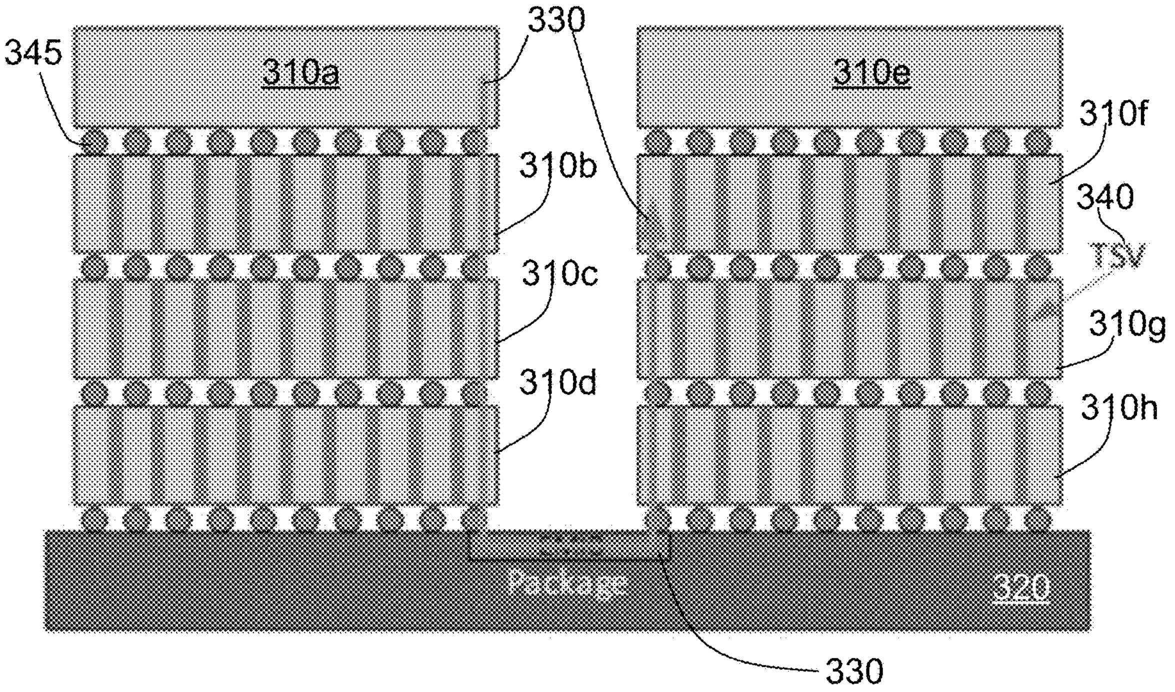
FIG. 3 depicts a module device as an example of a 3D heterogeneous integration of integrated circuits or components.
Figure 4:
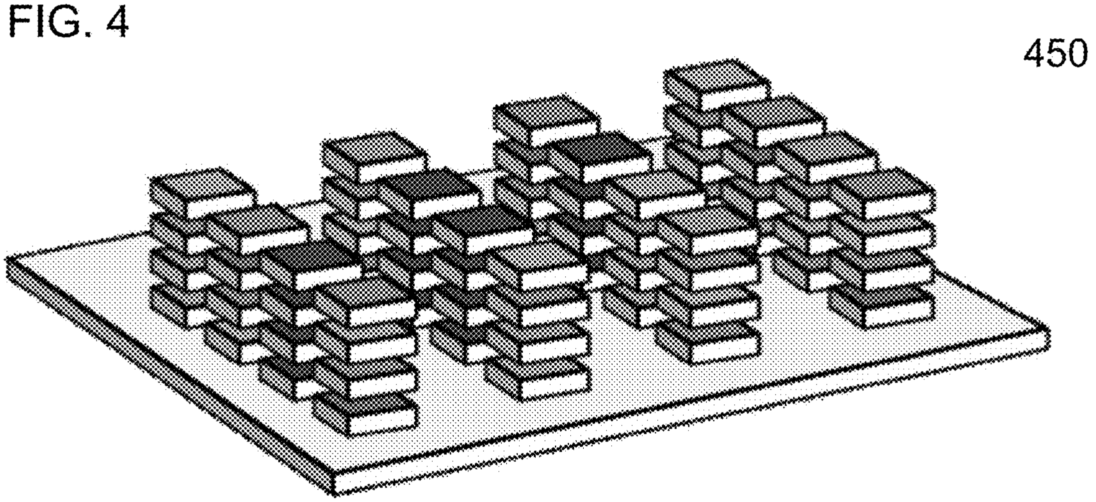
FIG. 4 depicts an exemplary multi-chip-module (MCM) implemented with a Manhattan architecture.

The module device 300 of FIG. 3 and FIG. 4 is one example of a 3D heterogeneous integration of integrated circuits or components (e.g., chiplets). The device 300 integrates disaggregated components in vertical stacks. The device includes at least a first vertical stack of chiplets 310*a-d* and a second vertical stack of chiplets 310*e-f*. In some examples, the chiplets may be any type of hardware component, e.g., include any type of processor (e.g., CPU, GPU, etc.), AI engine, accelerator, memory, or other suitable or desired component. As shown, the vertically adjacent chiplets are connected to one another using TSVs 340 and bumps 345. Further, the packaging substrate 320 providing a mount for each stack can further include a bridge 330 for connecting the vertical stacks of chiplets. Specifically, the bridge 330 can directly connect the lower chiplet/component 310*d* of one stack with the lower chiplet/component 310*h* of the second stack. One example of a bridge is an embedded multi-die interconnect bridge (EMIB).

3D heterogonous integrated devices may be built with a Manhattan-like architecture which includes large X-Y arrays of heterogeneous chiplets (e.g., CPU, GPU, AI, memory, etc.), and each chiplet can be positioned as on a chess board, having several stacked dies. FIG. 4 depicts a device 450 which is an MCM implemented with a Manhattan architecture. The vertical dimension allows for greater connectivity and more design possibilities. Further, the 3D heterogeneous integration of resources may provide devices that provide improved performance, cost efficiency, and design flexibility, compared to monolithic integration. Since the most advanced silicon technologies are economically feasible for chiplets with the most performance-intensive functions, it is advantageous to disaggregate these chiplets from chiplets based on prior generation node. Therefore, chiplet-based 3D heterogeneous integration approach to product development not only promises to reduce cost, but also can improve time-to-market.

Nevertheless, the above-mentioned technologies do not scale well for massive 3D integration because the data rate per line may only be 2 to 10 Gbps. For example, referring to the wired interconnection approach for the device 300, no chiplets or components other than the lower two chiplets 310*d* and 310*h* have a direct connection. Therefore, if the chiplet 310*a* needs to connect and communicate with the chiplet 310*f*, the data path 330 would have to be one that extends through the TSVs 340 of the chiplets 310*b*-310*d* on the first stack, through the EMIB 330, and then through the TSVs 340 of the chiplets 310*g* and 310*h* before arriving at the chiplet 310*f*. Therefore, communication between chiplets would often require the use of many connections. The more and more components are added, thereby requiring communication with each other, the more the traffic in the TSVs, EMIBs, interposers, etc. increases. This increase in traffic presents problems in cases where high-transport data connections are needed.

For example, to create an aggregate data transport of 1 Tbps, 100 to 500 interconnect lines would be needed. While such data transports are possible for communication between neighboring chips, it would be physically and economically unfeasible to provide such data transports for larger integrations that involve hundreds of interconnect lines between horizontal and vertical stacked chips.

Further, the cost of a silicon interposer is proportional to the area of that interposer. So, in cases needing several or many localized high-density interconnects, the costs can quickly accumulate.

In short, TSV silicon interposers are relatively expensive and do not scale well for applications that require a massive number of components e.g., chiplets. Further, wires (interconnects) that connect together chips or chiplets degrade in performance with scaling. That is, wires can dominate the performance, functionality and power consumption of ICs.

The use of wireless Chip-to-Chip interconnects is an approach for realizing high-speed transport that would meet the requirements for high-performance computing products and applications. The wireless chip-to-chip (WC2C) technology can complement wired communications. WC2C can provide additional flexibility for high-performance computing products by enabling broadcast and multipoint-to-multipoint links with significant advantages for dynamically reconfigurable data-center networks.

Figure 5:
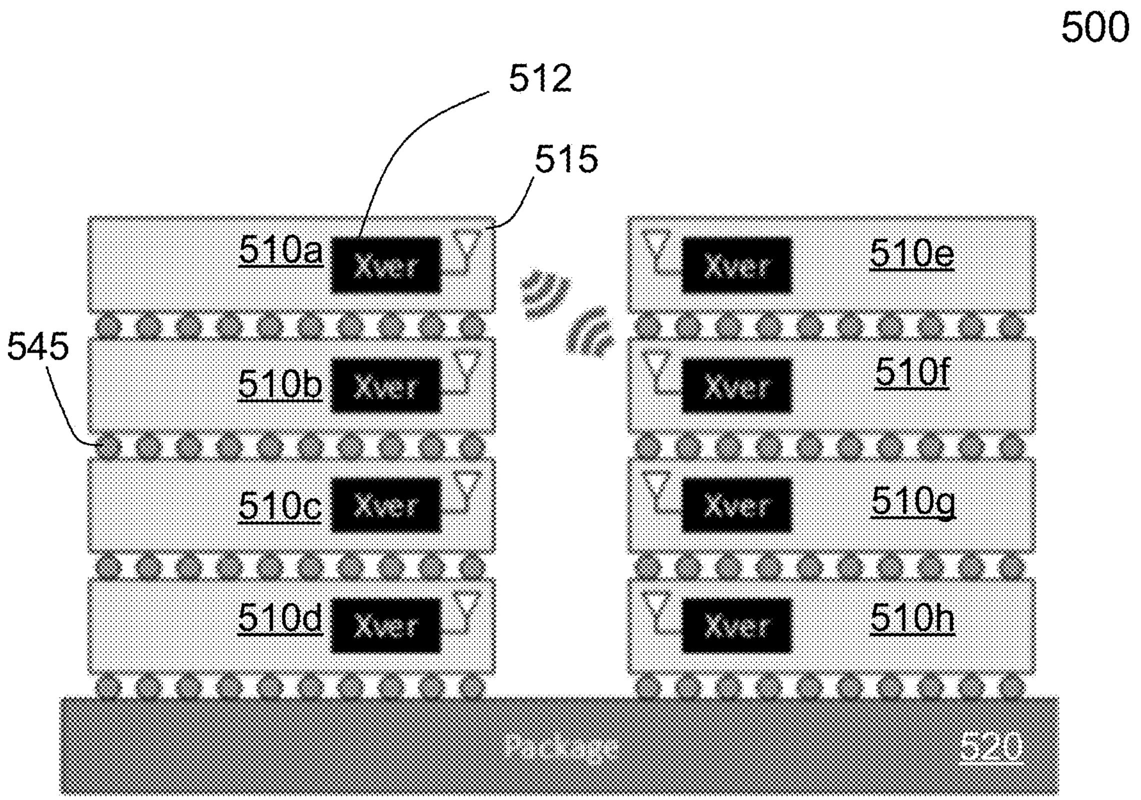
FIG. 5 depicts an example of an MCM incorporating wireless interconnections.

FIG. 5 shows an example of an MCM (MCM) 500 incorporating wireless interconnections. The MCM 500 includes a 3D integration of disaggregated resources (e.g., chiplets 510*a-c*).

The chiplets 510 can be stacked and mounted on a package substrate 520. To enable wireless connection, each chiplet or component can include an antenna (e.g., an antenna or antenna structure 515) and radio circuitry, e.g., transceiver circuitry 512. In addition, module 500 can include or provide wired communication between components. Similar to the module 300 of FIG. 3, the chiplets 510 may include TSVs (not shown) and bumps 545 that can allow for vertical interconnection. Further, the packaging substrate 520 can include bridges (e.g., EMIBs) and other types of interconnects or routing lines for providing connections between components.

WC2C communication may permit dense chiplet based products and supplement existing chip to chip communications, e.g., wired interconnections. As shown in the example of FIG. 5, the chiplet 510*a* can directly communicate wirelessly with the chiplet 510*f*. Therefore, in aspects of the present disclosure, the use of WC2C communication can be used to greatly relieve or reduce the data traffic through TSVs, interposers, or bridges and improve device performance, efficiency and allow for greater and more massive 3D heterogeneous integration.

According to aspects of the present disclosure, to implement WC2C communication, an MCM such as the module 500 may implement protocols that can be divided into a control plane and a data plane.

The data plane carries the network data (e.g., in-module data) in accordance with the directives of the control plane. That is, the data plane performs the actual forwarding of the data according to the configuration or routing paths managed and set forth by the control plane.

In at least some cases, the data plane of WC2C communications may operate with frequencies in the 110-170 GHz D-band using CMOS circuits with economical power efficiency. For example, in some aspects, the antennas may have approximately 1 mm of spacing. As CMOS technology continues to evolve and improve, higher frequencies, the reduction of the size and spacing of antenna elements, and higher bandwidths can be realized.

The modules implementing WC2C communication can include control plane capabilities. That is, to augment the above-mentioned high-speed wireless data links or the data plane, control plane capabilities or functionalities can be included in the modules. Control plane functions implemented using wireless control signaling can establish the wireless data connections described herein. The control plane protocols can be used to establish wireless connections within a module or package and further to define routing paths for the data. For example, industry protocols, including Wi-Fi, $I^2C$, USB, and/or other known protocol are possible.

Figure 6:
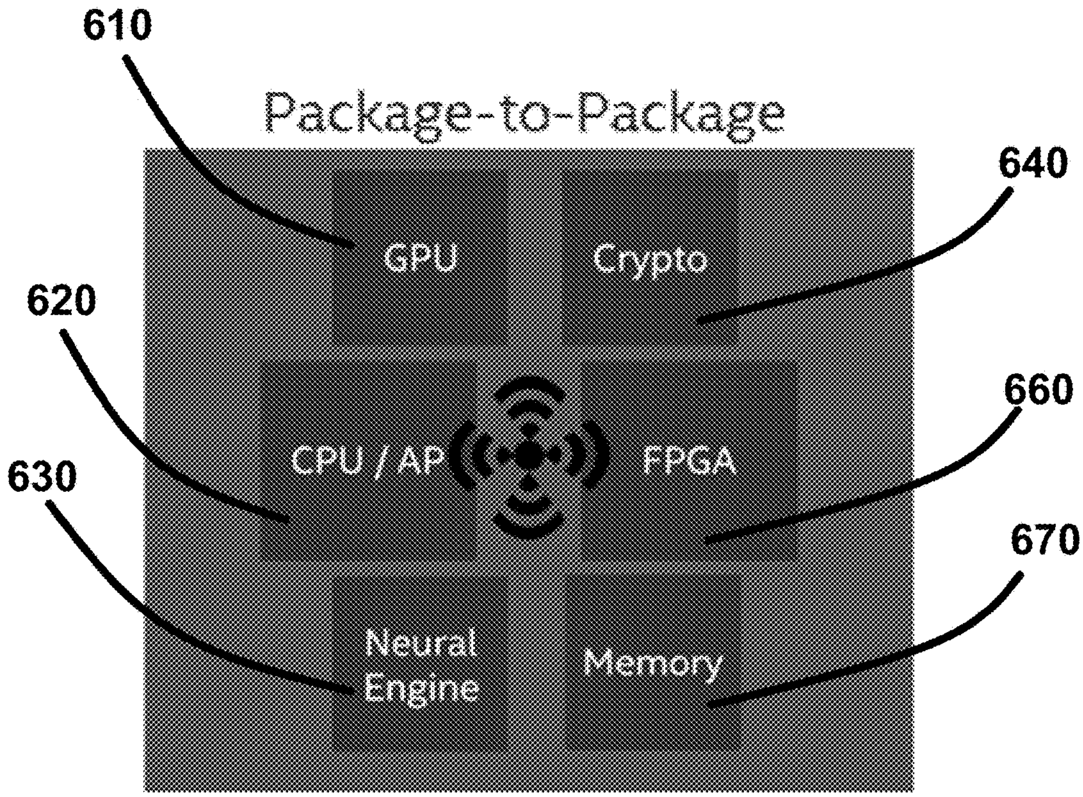
FIG. 6 depicts a multichip device with wireless package-to-package communications.

Control plane messages or control signaling may be in the form of packets to inform other components where to forward data or data messages. In some aspects, the control plane messages of an MCM may be implemented by using frequencies that differ from the data or data plane messages to manage and configure network data or data being transmitted to and from the components of a multichip device. In some cases, the messages may be implemented in a package-to-package type of communication scheme. For example, as described herein, a multichip device may include components that have their own individual packaging. (This is in contrast to an MCM of chiplets which may be packaged together (e.g., the dies of the chiplets share a common package)). In such cases, the multichip device may include wireless package-to-package communications. This is the scenario of FIG. 6, where in the device, the several components (GPU 610, CPU 620, Neural Engine 630, Cryptoprocessor 640, Field-programmable gate array (FPGA) 660, Memory device 670) have their own packaging which includes wireless circuitry to implement wireless package-to-package communications.

Figure 7:
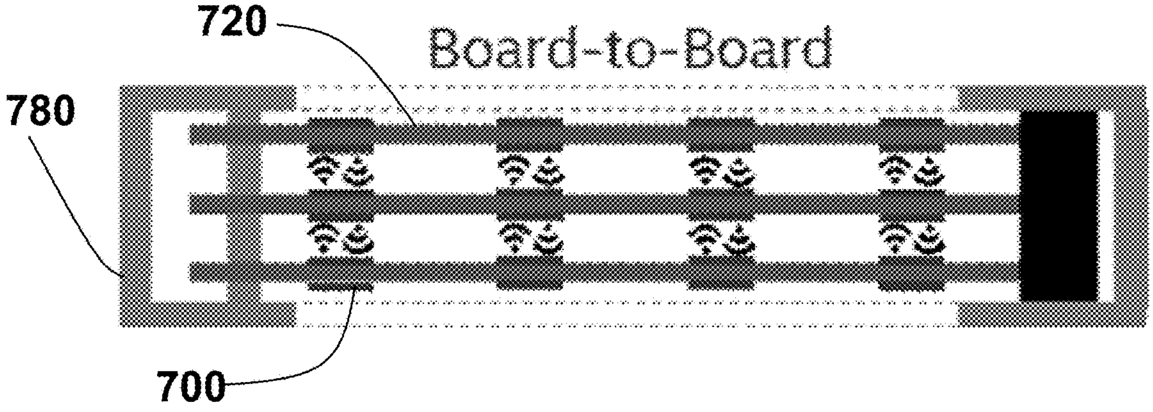
FIG. 7 depicts an example of an MCM.
Figure 8:
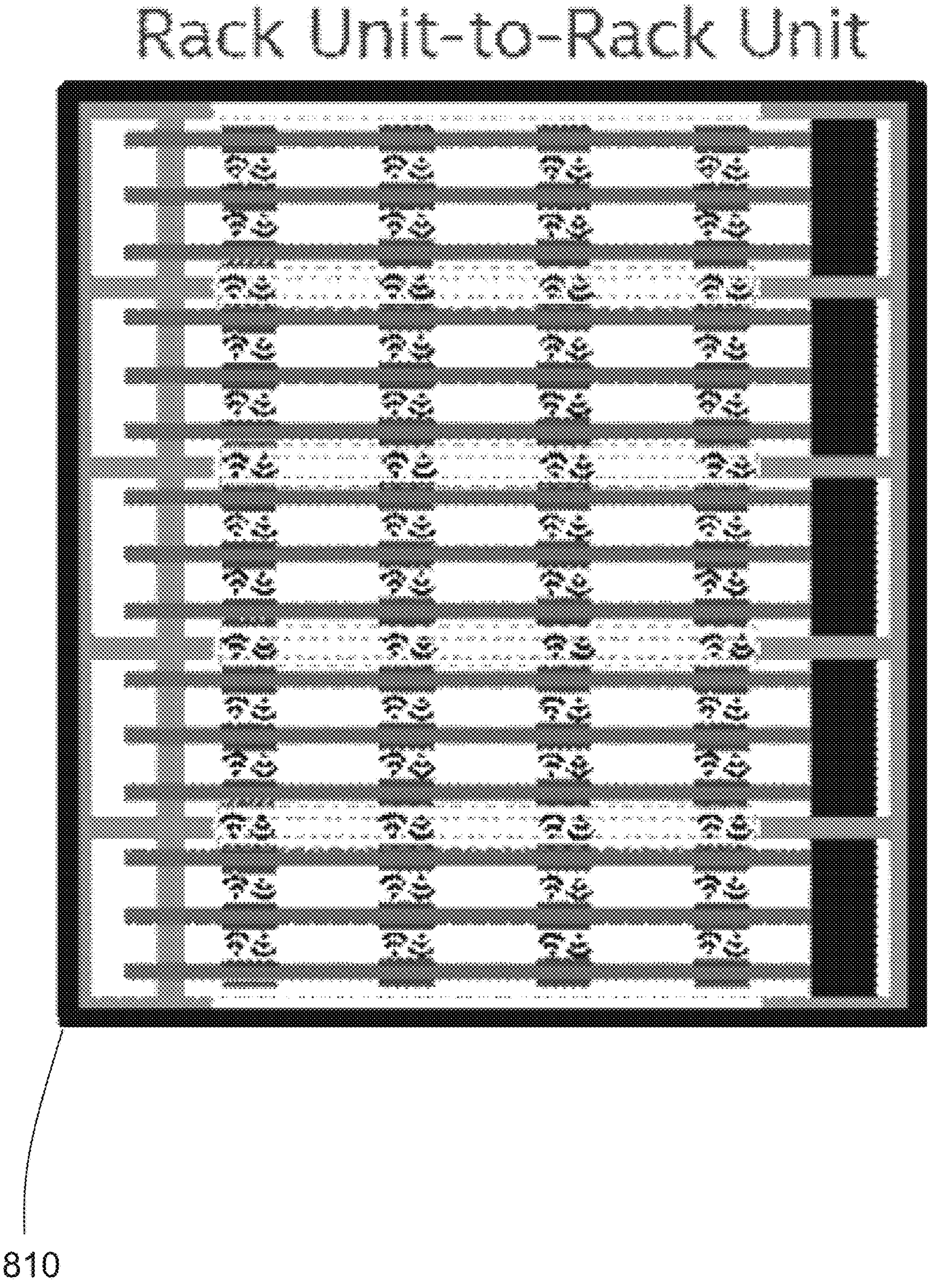
FIG. 8 shows an extension of wireless communication to rack-unit-to-rack-unit communication.

The control plane may manage communication not only for traffic within a multichip package (also denoted as in-package communication), but also may manage the communication between modules or packages e.g., MCMs or packages. This type of communication may be considered as wireless package-to-package communications. Furthermore, the control plane may be used for facilitating board-to-board communications in FIG. 7. That is, the devices or MCMs described herein can be mounted on boards, such as the boards 720, which in turn may be housed in a rack unit, such as the rack unit 780. In board-to-board communication, wireless communication may occur between the mounted devices (e.g., MCMs) of different boards 720. In addition, FIG. 8 shows that wireless communication may be extended to rack-unit-to-rack-unit communication, e.g., within a chassis 810 of the rack.

In aspects of the present disclosure, control plane circuitry can be provided in dies of an MCM and configured to provide control plane functions for a wireless communication network involving devices (e.g., MCMs), dies, and packages described herein. The control plane circuitry may operate or use, as an example sub-10 GHZ RF carrier technology to enable point-multipoint, broadcastable, full-duplex wireless control/manageability links for various scenarios, e.g., board-board, package-package, and chiplet-to-chiplet within a package, type communications. Control signaling may be in the form of packets reflecting any suitable type of control plane protocol. The control plane circuitry may be integrated in an application-specific manner in a module. Components of the control plane circuitry such as the transceiver circuitry or the antenna structure may be integrated or incorporated with any part of an MCM described herein. Further, aspects or components of the control plane circuitry such as the antenna, connections, or waveguides, may also be included or incorporated into other components holding or involving MCMs, such as boards, chassis, racks, etc.

According to aspects of the present disclosure, sub-10 GHz technology may be used for control signaling. Operation at sub-10 GHz can allow for process portability and easy adoption of the radio frequency (RF) transceiver and may use near-field couplers/antennas. The flexibility of an RF link can allow convenient placement and use within a product chassis, from rack-unit-to-rack-unit, and for 3D heterogeneously integrated semiconductor products. For example, in at least some aspect of the present disclosure, control signaling bit rates may be in the range of 0.5-2 Gbps over distances up to 20 cm, supporting both symmetric and asymmetric topologies. The distance may decrease with increasing frequency, e.g., for a frequency of up to about 100 GHZ the distance may be in the range of about 1 cm.

Figure 9:
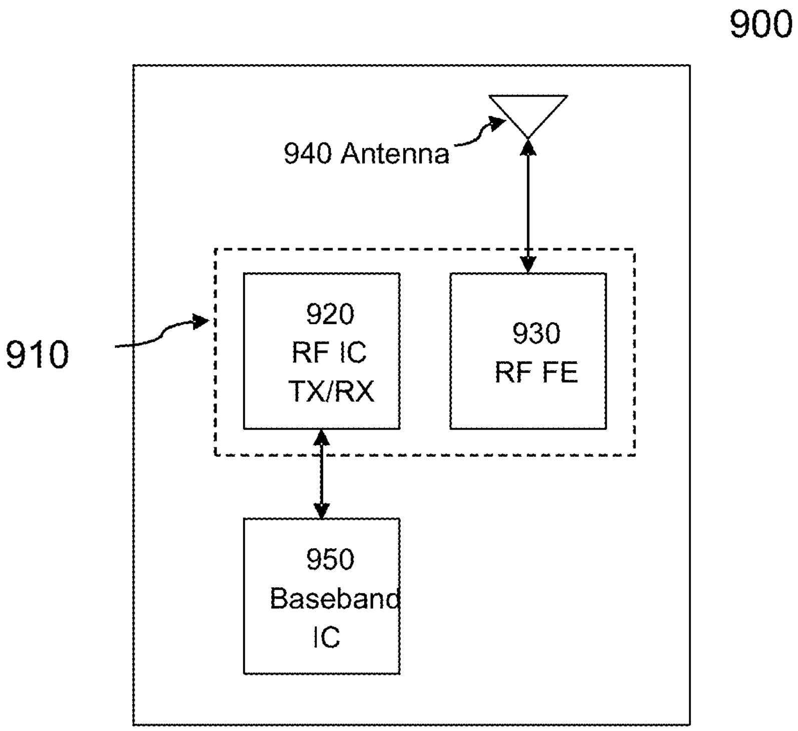
FIG. 9 shows a block diagram showing a wireless circuitry.

For the WC2C communications, both the data plane and control plane require the use of a RF circuitry. FIG. 9 shows a block diagram showing a wireless circuitry 900. The wireless circuitry 900 includes a hardware component, e.g., a baseband integrated circuit 950 for baseband signal processing, a radio circuitry 910 for radio frequency signal processing, and an antenna or antenna structure 940.

The radio circuitry 910 may include an RF integrated circuit (IC) 920 including one or more RF transceivers (TRX) and a common RF front end (FE) 930. The RF IC 920 may receive one or more data and control signals (also denoted as signal of the control plane of the OSI model) and operate to receive a communication signal from the baseband IC and generate an RF electrical signal from the communication signal for radio transmission from the circuitry 900 or receive an RF electrical signal and generate a communication signal from the RF electrical signal for providing to the baseband IC. The RF FE 930 may convert an RF electrical signal into a format for transmission via the antenna 940 and/or convert a signal received from the antenna 940 into an RF electrical signal for the RF IC 920.

Figure 10:
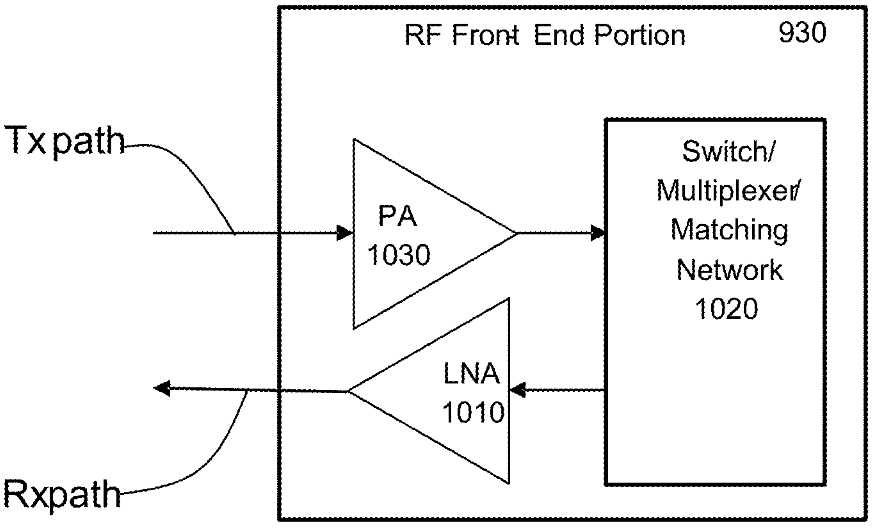
FIG. 10 shows an example of a radiofrequency front end portion that may be implemented in the circuitry.

FIG. 10 shows an example of a RF front end portion 930 that may be implemented in the circuitry 900. A receive signal path (Rx path) of the RF front end 930 of FIG. 10 includes an LNA (low noise amplifier) 1010 for amplifying received RF signals and provides the amplified received RF signals as an output. A transmit signal path (Tx path) of the RF front end 930 of FIG. 10 includes a PA (power amplifier) 1030 for amplifying input RF signals. One or more filters may be included for generating suitable RF signals for transmission and reception. In addition, the RF front-end 930 of FIG. 10 may include other components 1020 or circuitry, such as, for example, a tuner or matching network, switches, multiplexers, and/or other circuitry for coupling the RF front end 930 to an antenna 940 as illustrated in FIG. 9. In addition, other components may be included to support both transmit and receive modes.

The RF FE 930 of at least FIG. 9 can provide signals obtained from the antenna 940 to the RFIC 920. The transceiver chain or RFIC 920 can interface between the RF FE 930 and one or more other components.

Figure 11:
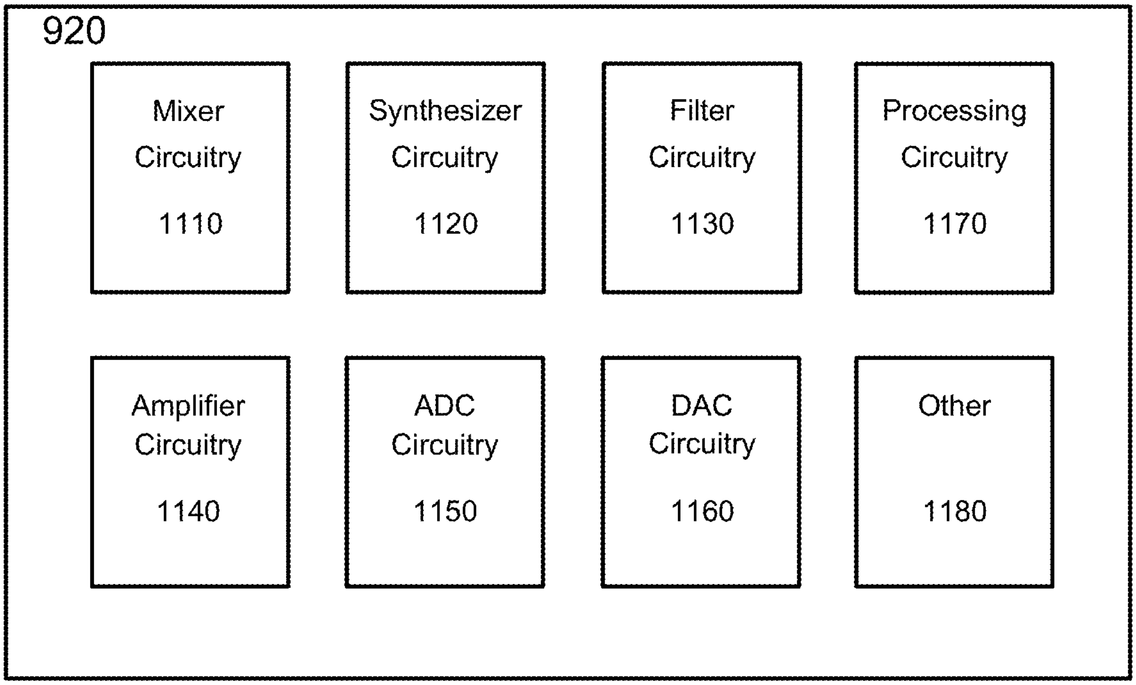
FIG. 11 shows an example of a radiofrequency integrated circuit or transceiver circuitry.

FIG. 11 shows one example of the RFIC or transceiver circuitry 920. As shown, the transceiver chain/RFIC 920 can include components such as a mixer circuitry 1110, synthesizer circuitry 1120 (e.g., local oscillator), filter circuitry 1130 (e.g., baseband filter), amplifier circuitry 1140, analog-to-digital converter (ADC) circuitry 1150, digital-to-analog (DAC) circuitry 1160, processing circuitry 1170, and other suitable digital front end (DFE) components 1180, to name a few. The processing circuitry 1170 may include a processor, such as one or more time-domain and/or frequency domain processor/components in at least one example.

The other components 1180 may include logic components, modulation/demodulation elements, and an interface circuitry for interfacing with another component.

DFE (digital front end) components may include any suitable number and/or type of components configured to perform functions known to be associated with digital front ends. This may include digital processing circuitry, portions of processing circuitry, one or more portions of an on-board chiplet having dedicated digital front end functionality (e.g., a digital signal processor), etc. The DFE components may selectively perform specific functions based upon the operating mode of the radio circuitry 910 and, for example, may facilitate beamforming. Digital front end components may also include other components associated with data transmission such as, for instance, transmitter impairment correction such as LO correction, DC offset correction, IQ imbalance correction, and ADC skew, digital pre-distortion (DPD) calculation, correction factor (CF) calculation, and pre-emphasis (pre. emp.) calculation. To provide additional examples, the digital front end components 1180 may facilitate or perform receiver or transmitter digital gain control (DGC), up-sampling, down-sampling, zero crossing detection algorithms, phase modulation, perform beam management, digital blocker cancellation, received signal strength indicator (RSSI) measurements, DPD and calibration accelerators, test signal generation, etc.

In at least one example, the transceiver chain (of the RF IC 920) can include a receive signal path which may include mixer circuitry 1110, amplifier circuitry 1140 and filter circuitry 1130. In some aspects, the transmit signal path of the transceiver chain 920 may include filter circuitry 1130 and mixer circuitry 1110. The transceiver chain 920 may also include synthesizer circuitry 1120 for synthesizing a frequency signal for use by the mixer circuitry 1110 of the receive signal path and the transmit signal path. In some aspects, the mixer circuitry 1110 of the receive signal path may be configured to down-convert RF signals received from the RF FE 930 based on the synthesized frequency provided by synthesizer circuitry 1120.

In some aspects, the output baseband signals and the input baseband signals may be digital baseband signals. In such aspects, the radio circuitry 910 may include analog-to-digital converter (ADC) 1150 and digital-to-analog converter (DAC) circuitry 1160.

In at least one example, the transceiver chain 920 may also include a transmit signal path (Tx path) which may include circuitry to up-convert baseband signals provided by e.g., a modem and provide RF output signals to the RF FE 930 for transmission. In some aspects, the receive signal path may include mixer circuitry 1110, amplifier circuitry 1140 and filter circuitry 1130. In some aspects, the transmit signal path of the RFIC 920 may include filter circuitry 1130 and mixer circuitry 1110. The RFIC 920 may include synthesizer circuitry 1120 for synthesizing a frequency signal for use by the mixer circuitry 1110 of the receive signal path and the transmit signal path. The mixer circuitry 1110 of the receive signal path may be configured to down-convert RF signals received from the RF FE 930 based on the synthesized frequency provided by synthesizer circuitry 1120.

In various aspects, amplifier circuitry 1140 may be configured to amplify the down-converted signals and filter circuitry may be a low-pass filter (LPF) or band-pass filter (BPF) configured to remove unwanted signals from the down-converted signals to generate output baseband signals. Output baseband signals may be provided to another component for further processing. In some aspects, the output baseband signals may be zero-frequency baseband signals, although this is not a requirement.

The mixer circuitry 1110 for a receive signal path may include passive mixers, although the scope of this disclosure is not limited in this respect. In some aspects, the mixer circuitry 1110 for a transmit signal path may be configured to up-convert input baseband signals based on the synthesized frequency provided by the synthesizer circuitry 1120 to generate RF output signals for the RF FE 930.

In some aspects, the mixer circuitry 1110 of the receive signal path and the mixer circuitry 1110 of the transmit signal path may include two or more mixers and may be arranged for quadrature downconversion and upconversion, respectively. In some aspects, the mixer circuitry 1110 of the receive signal path and the mixer circuitry 1110 of the transmit signal path may include two or more mixers and may be arranged for image rejection (e.g., Hartley image rejection). In some aspects, the mixer circuitry 1110 of the receive signal path and the mixer circuitry 1110 may be arranged for direct downconversion and direct upconversion, respectively. In some aspects, the mixer circuitry 1110 of the receive signal path and the mixer circuitry 1110 of the transmit signal path may be configured for super-heterodyne operation.

In some aspects, the synthesizer circuitry 1120 may be a fractional-N synthesizer or a fractional N/N+1 synthesizer, although the scope of the aspects is not limited in this respect as other types of frequency synthesizers may be suitable. For example, synthesizer circuitry 1120 may be a delta-sigma synthesizer, a frequency multiplier, or a synthesizer including a phase-locked loop with a frequency divider.

The synthesizer circuitry 1120 may be configured to synthesize an output frequency for use by the mixer circuitry 1110 of the radio circuitry 1120 based on a frequency input and a divider control input. In some aspects, the synthesizer circuitry 1120 may be a fractional N/N+1 synthesizer.

In some aspects, frequency input may be provided by a voltage-controlled oscillator (VCO), although that is not a requirement. In various cases, divider control input may be provided by a processing component of the RFIC 920, or may be provided by any suitable component. In some aspects, a divider control input (e.g., N) may be determined from a look-up table based on a channel indicated by external component.

In some aspects, synthesizer circuitry 1120 of the RFIC 920 may include a divider, a delay-locked loop (DLL), a multiplexer and a phase accumulator. In some aspects, the divider may be a dual modulus divider (DMD), and the phase accumulator may be a digital phase accumulator (DPA). In some aspects, the DMD may be configured to divide the input signal by either N or N+1 (e.g., based on a carry out) to provide a fractional division ratio. In some aspects, the DLL may include a set of cascaded, tunable, delay elements, a phase detector, a charge pump and a D-type flip-flop. The delay elements may be configured to break a VCO period up into No equal packets of phase, where Nd is the number of delay elements in the delay line. In this way, the DLL provides negative feedback to help ensure that the total delay through the delay line is one VCO cycle.

In some aspects, synthesizer circuitry 1120 may be configured to generate a carrier frequency as the output frequency, while in other aspects, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency may be a LO frequency (fLO). In some aspects, the RFIC 920 may include an IQ/polar converter.

Figure 12:
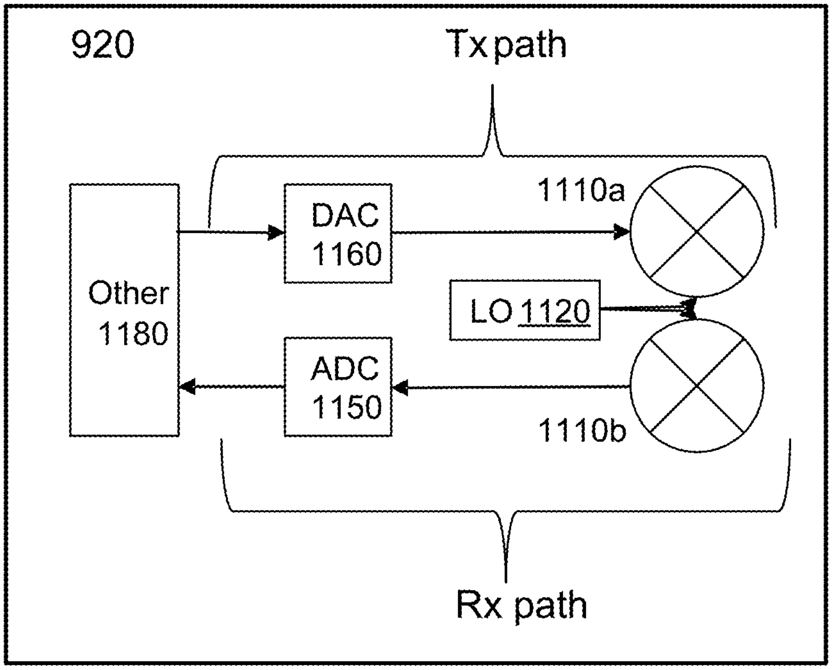
FIG. 12 shows an example of a transceiver chain.

FIG. 12 shows one example of a transceiver chain/RFIC 920 that may be implemented. The receive signal path (Rx path) circuitry down-converts RF signals received from the RF FE 930 and provides baseband signals. Specifically, the receive signal path may include a mixer 1110*b* and an ADC 1150. The transmit signal path (Tx path) circuitry up-converts provided baseband signals and provides RF output signals to the RF front end 930 for transmission. Specifically, the transmit signal path may include a DAC 1160 and a mixer 1110*a*. The transceiver chain shown in FIG. 12 includes a synthesizer circuit, specifically, at least one local oscillator (LO) 1120 to generate reference signals for the mixers 1110*a* and 1110*b*.

The antenna 940, illustrated in FIG. 9, may include a single antenna for transmission and reception. In other cases, the antenna or antenna structure 940 may include multiple transmit antennas in the form of a transmit antenna array and multiple receive antennas in the form of a receive antenna array.

In other cases, the antenna 940 may be one or more antennas to be used as transmit and receive antennas. In such cases, the RF FE 930 may include, for example, a duplexer, to separate transmitted signals from received signals.

While the transceivers described herein include traditional super-heterodyning schemes or architectures, other type of transceiver or transmitter architectures and schemes may be used. In some aspects, the transceiver chain of the RFIC 920 may include components so as to implement a near zero IF scheme, a Direct Conversion scheme, or a digital transmission scheme, such as, for example, a Digital IQ transmission, a Digital Polar transmission, and the like.

In one example, the transceiver chain of the RFIC 920 may include a transmit path that includes or implements a direct digital transmitter (DDT). That is, in one simple example, a DDT may include a digital signal processor, a RF digital-to-analog converter (RFDAC), a PA, and a RF filter/antenna coupler. Referring back to FIG. 12, in cases where the DAC 1160 is a direct RF DAC that produces RF output directly from digital input, the mixer 1110*a* can be omitted from the transmit path.

For example, a DDT may be implemented with or without an IQ-mixer. In general, a RF-DAC may be included on a RFIC to convert digital input into a RF signal. A DDT may include other digital components such as numerically controlled oscillator (NCO) and digital mixers for shifting an input signal to desired frequency. The use of a DDT can reduces the number of analog components needed in the transmitter or transmit path. For example, analog LOs, analog filters, analog mixers, and etc., may be eliminated from the RFIC when a direct digital transmitter (DDT) is employed. Further, the use of a digital transmitter or digital transmission schemes such may bring energy savings and efficiencies.

Figure 13:
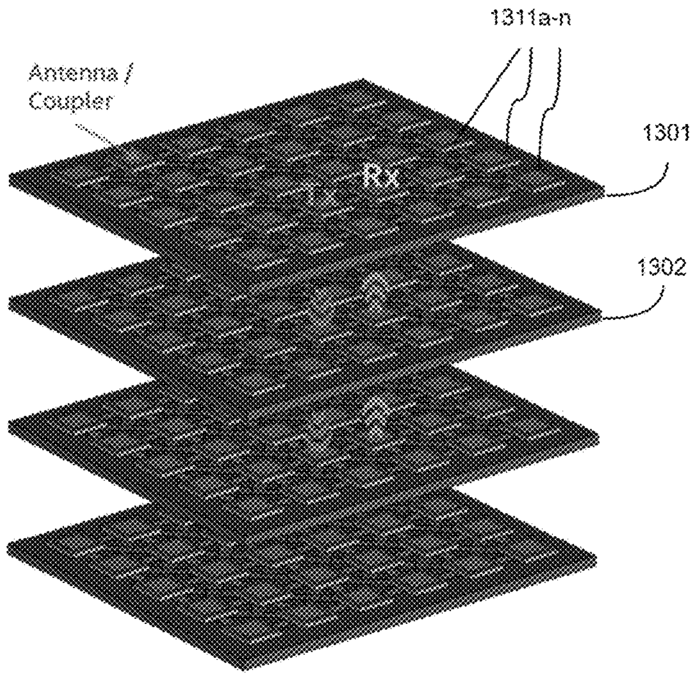
FIG. 13 shows an exemplary illustration of a multi-chip system.

FIG. 13 shows an exemplary illustration of a multi-chip system (e.g., a large-scale computing system) in which chips may communicate with each other via direct vertical wireless interconnects. The system may include multiple substrates (1301, 1302), and each substrate 1301 may include multiple chips (1311*a-n*). Wireless interconnects may allow respective chips to communicate without have extra latency, going through dense wire traces or complex network/interconnect meshing. In addition, such a vertical wireless interconnect capability allows flexible, three-dimensional (3D) floor planning of components on their respective substrates within an enclosed chassis.

However, wireless vertical chip-to-chip interconnects may have interference challenges when multiple adjacent chips are transmitting and receiving data simultaneously. Various potential solutions including interference cancellation techniques, orthogonal polarizations/modes, and stub with impedance loading have been proposed, but these solutions may remain effective for small-size systems, e.g., 2 antennas/couplers, and they do not scale to large-size systems with many antennas/couplers in proximity. Thus, people considered blocking the interferences by surrounding vertical metallic walls.

However, such physical structures that would reduce or prevent thermal flow by reducing the size of the space provided between substrates. Given that large-scale systems often suffer from thermal challenges due to the large number of chips, the vertical metallic walls not only block electromagnetic interferences, but also adversely impact overall thermal performance (e.g., increased system pressure drop, reduced air flow rates). It may be desirable to reduce EM interference while allowing thermal flow of air or fluid cooling via employment of metamaterials. The proposed solution can immediately scale to large-size computing systems with N×M antennas (antennas or couplers).

Figure 14A:
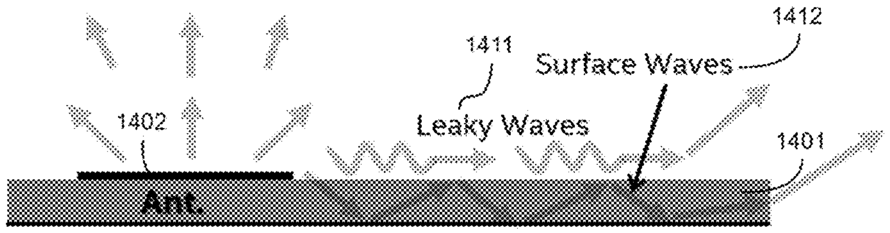
FIG. 14A shows an exemplary illustration of EM waves radiated by an antenna.

FIG. 14A shows an exemplary illustration of EM waves radiated by an antenna. A substrate 1401 including an antenna 1402 is provided. The antenna radiates EM waves in a desired direction (e.g., vertically). For example, an antenna of another chip provided on a further substrate is at the desired direction. Furthermore, the antenna 1402 radiates surface waves 1412 which are EM waves travelling inside the substrate of the antenna 1402, which are emitted laterally instead of desired vertical direction. Furthermore, there may be leaky waves 1411 which propagate along the surface of the substrate of the antenna. In accordance with various aspects provided herein, a metamaterial might have been disposed on right hand side of the antenna to reduce and/or block the flow of leaky waves and surface waves to the space at the right-hand side.

Figure 14B:
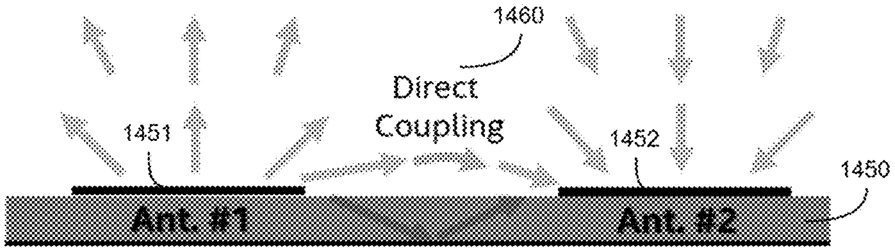
FIG. 14B shows an exemplary illustration of two antennas provided on a substrate.

FIG. 14B shows an exemplary illustration of two antennas provided on a substrate. The substrate 1450 includes a first antenna 1451 and a second antenna 1452. The first antenna 1451 may radiate EM waves at a desired direction (e.g., vertically), and the second antenna 1452 may receive EM waves from a desired direction (e.g. vertically). Due to the placement of the antennas 1451, 1452, there may be a direct coupling 1460 between the antennas 1451, 1452. In accordance with various aspects provided herein, a metamaterial may have been disposed to the space between the first antenna 1451 and the second antenna 1452, which the metamaterial may form a surface with effective negative permeability. The formed surface may intersect the space associated with the direct coupling.

Figure 15:
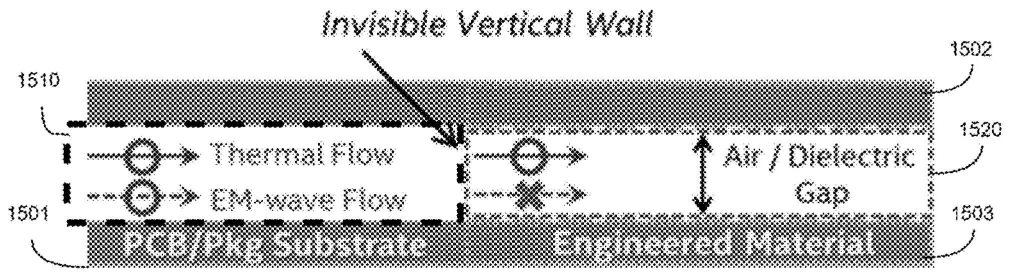
FIG. 15 illustrates the concept of the use of metamaterial for interference reduction.

FIG. 15 exemplary illustrates the concept of the use of metamaterial for interference reduction. A first substrate 1501 is provided (e.g. a PCB substrate, a packaging substrate) with a spaced apart relationship with a second substrate 1502 with a space in between. The space in-between may be a gap or a cavity depending on the structure of the apparatus including the first substrate 1501, and optionally the second substrate 1502. The space may allow the substrates 1501, 1502 to be cooled via flowing of air or cooling liquid. In particular within the context of chip-to-chip communication, the substrates 1501, 1502 may be neighboring substrates provided with respect to FIG. 13. At least one of the substrates 1501 may include a metamaterial 1503 (depicted as engineered material). The metamaterial 1503 may be considered as a structure that forms a surface within the space with effective negative permeability.

During operation, assuming that there is an EM wave source (e.g. an antenna) at the left-hand side of the figure causing EM-waves flow from left hand side to the right-hand side, in section 1510 of the space, EM waves flow towards the section 1520 of the space. Section 1520 of the space represents the section of the space interacted by the metamaterial 1503. The metamaterial 1503 may form a surface with effective negative permeability, causing electric fields to be absorbed (or reflected back). The section 1520 is referred to as "invisible vertical wall" indicating that a formed metasurface is provided between the second substrate 1502 and the metamaterial 1503 such that formed metasurface does not allow electric fields incident from the left-hand side to be passed to the right-hand side at the section 1520. On the other hand, the thermal flow may not be interrupted/reduced, and the cooling material (e.g. air or cooling liquid) may still flow at the section 1520.

Considering that the communication between entities of neighboring substrates is in vertical direction (i.e. each antenna has a desired Tx/Rx direction vertically), a substrate (e.g. the substrate 1501) may include an antenna, and the metamaterial 1503 may be provided such that it surrounds (i.e. encircles or enclose on one or both sides) the antenna.

Various aspects provided in this disclosure may relate to the above conceptual application. In a more concrete way, such metamaterial may be provided to block transition of electric fields for a particular volume which the interference may be an issue, while allowing the flow of the cooling material is expected within the particular volume.

Figure 16:
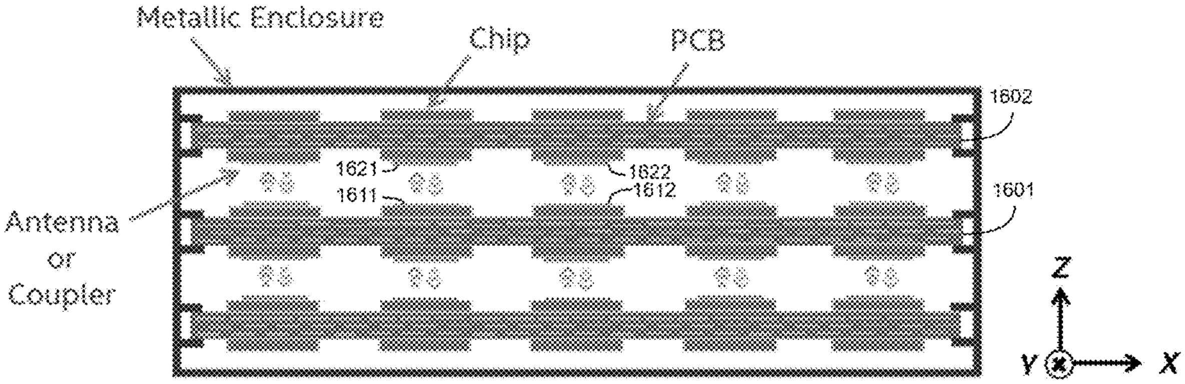
FIG. 16 exemplarily illustrates a cross sectional view of a multi-chip system.

FIG. 16 exemplarily illustrates a cross sectional view of a multi-chip system, such as a large-scale computing system, with wireless interconnects. The system includes multiple substrates provided in a metallic enclosure, including a first substrate 1601 and a second substrate 1602 as two neighboring substrates. The first substrate 1601 and the second substrate 1602 are held by positioning elements, such that there is a space between facing surfaces of the first substrate 1601 and the second substrate 1602, that face each other. The space may have a cooling material such as air, or a cooling liquid. The substrates may be PCBs. In this illustrative example, each substrate has multiple chips, chiplets, or ICs, which are collectively to be referred to as chips for brevity, provided on each surface of the substrate defined at x and y direction.

First chips provided on a surface of a first substrate 1601, which the surface is facing a surface of the second substrate 1602. The second substrate 1602 includes second chips provided on the surface of the second substrate 1602. At least one or two of the first chips may communicate with the at least one or two of the second chips via wireless interconnects. In this illustration, each of the first chips may communicate with a respective chip of the second chips. Each first chip and each second chip include a communication element such as an antenna or a coupler. The antennas of chips facing each other (i.e. a first chip and a second chip) may form a short-range wireless interconnection, via short-range wireless communication technologies, such as Bluetooth, Zigbee, Wi-Fi, NFC, capacitive coupling, etc.

In this illustrative example, the first substrate 1601 includes a first chip 1611 and a second chip 1612. The second substrate 1602 includes a first chip 1621 and a second chip 1622. The first chip 1611 of the first substrate 1601 may communicate with the first chip 1621 of the second substrate 1602 via a first short-range wireless interconnect. Similarly, the second chip 1612 of the first substrate 1601 may communicate with the second chip 1622 of the second substrate 1602 via a second short-range wireless interconnect.

In some examples, the multi-chip system may be a multi-chip system of a communication device. Exemplarily, the first chip 1611 and the second chip 1612 of the first substrate 1601 may include RFICs respectively. The first chip 1621 and the second chip 1622 of the second substrate 1602 may include chips configured to communicate with the RFICs respectively. Exemplarily, the first chip 1621 and the second chip 1622 of the second substrate 1602 may include baseband processors respectively to communicate with respective RFICs.

The transmitted electromagnetic waves from the antennas may excite a rectangular waveguide mode between the neighboring substrates and inside metallic enclosure. Most likely, the dominant waveguide mode would be the transverse electric (TE) mode between neighboring substrates and inside metallic enclosure due to the boundary conditions imposed by many metallic patterns on a substrate as well as four metallic surfaces of enclosure. For rectangular TE mode, electric fields are vertically oriented (Z-axis). In local areas in-between antennas, both vertically and horizontally-oriented electric fields can exist due to relatively short separation distance between them (i.e. near field region or radiating near-field region), although vertically-oriented electric fields can be still dominant. Hence, some aspects provided in this disclosure includes enabling innovative engineering material to cancel vertically-oriented electrical field interference.

Figure 17:
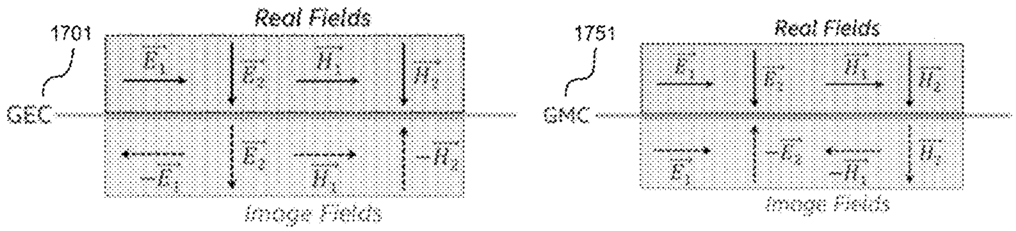
FIG. 17 illustrates exemplary boundary conditions.

FIG. 17 illustrates exemplary boundary conditions associated with a good electric conductor (GEC) 1701 and a good magnetic conductor (GMC) 1751. The GEC 1701 and GMC 1751 may refer to perfect electric conductor and perfect magnetic conductor respectively. Considering vector electromagnetic fields on the GEC 1701, which the vectors are illustrated above the GEC 1701 in the real field, their corresponding fictitious image fields are depicted as well below the GEC 1701. Due to the effect of the GEC 1701, electric fields parallel to the GEC 1701 and magnetic fields perpendicular to GEC 1701 are cancelled out.

Similarly, considering vector electromagnetic fields on the GMC 1751, which the vectors are illustrated above the GMC 1751 in the real field, their corresponding fictitious image fields are depicted as well below the GMC 1751. Magnetic fields parallel to GMC 1751 and electric fields perpendicular to GMC 1751 are cancelled out. Basically, GMC 1751 and GEC 1701 are in dual relationship of electric field and magnetic field.

The GMC 1751 is a material that exhibits effective negative permeability over a wide frequency range, but GMC 1751 does not exist in nature because there are no free-moving magnetic charges. Thus, metamaterials are developed that mimics the properties of a GMC, namely by exhibiting effective negative permeability by using engineered material technology. One particular example of such metamaterials is artificial magnetic conductors (AMCs). The AMC may exhibit effective negative permeability within a particular frequency range and is often implemented with array of engineered-material unit cells. Each unit cell may form a surface that exhibit effective negative permeability, which the size and orientation of the surface may be based on the dimension and placement of the unit cell.

It is to be noted that permeability, in EM context, refers to the ability of a material to support the strength of a magnetic field within it. The effective negative permeability of a material is a measure of the overall magnetic response of the material, taking into account both the intrinsic permeability of the material and any effects of external factors, such as the presence of other materials or the shape of the object. Accordingly, considering the forming of a surface with effective negative permeability, effective negative permeability refers to the overall magnetic response of the material, taking into account both intrinsic and external factors.

Figure 18:
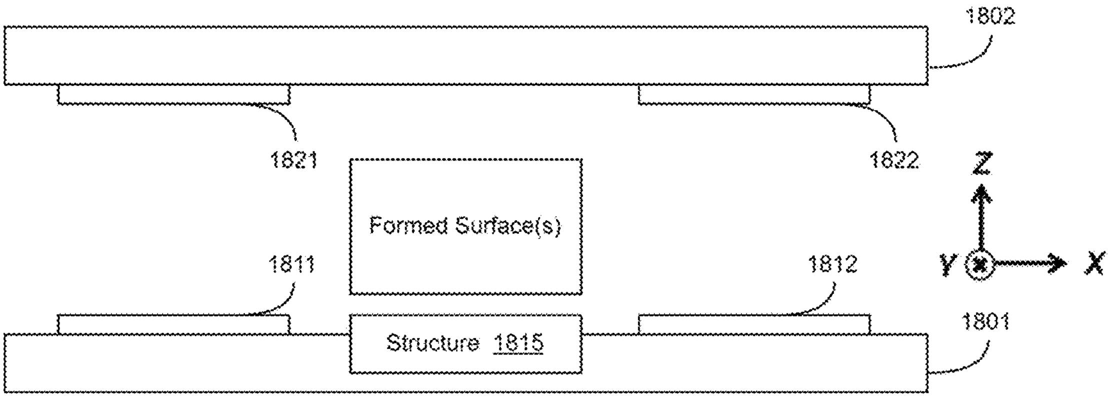
FIG. 18 shows an example of an apparatus.

FIG. 18 shows an example of an apparatus. The apparatus may be an apparatus of a multi-chip system, or an apparatus of a connector of which the details are provided in further portions of the disclosure. The apparatus may include a substrate 1801 including a first antenna 1811 and a second antenna 1812. The substrate 1801 of the apparatus may interoperate with a further substrate 1802. In some examples, the apparatus may include the further substrate 1802. In some examples, the further substrate 1802 may be a substrate that is external to the apparatus, and the apparatus may be positioned (e.g. via a fastener) with an external device including the further substrate, such that the respective surfaces including antennas mentioned herein face each other for short range wireless interconnection.

The further substrate 1802 may also include a first antenna 1821 and a second antenna 1822. The first antenna 1811 of the substrate 1801 may be configured to form a first short range wireless interconnect with the first antenna 1821 of the further substrate 1802. The second antenna 1812 of the substrate 1801 may be configured to form a second short range wireless interconnect with the second antenna 1822 of the further substrate 1802.

In particular within the context of wireless chip-to-chip communication, each substrate may correspond to a substrate of a board of a multi-chip system. Accordingly, each substrate may further include multiple chips (chiplets, ICs). Within this particular context, the substrate 1801 may include a first chip coupled to a first RF circuit that is coupled to the first antenna 1811, a second chip coupled to a second RF circuit that is coupled to the second antenna 1812. Similarly, the further substrate 1802 may include a first chip coupled to a first RF circuit that is coupled to the first antenna 1821, a second chip coupled to a second RF circuit that is coupled to the second antenna 1822.

Accordingly, the first short range wireless interconnect provides communication between the first chip of the substrate 1801 and the first chip of the further substrate 1802. The second short range wireless interconnect provides communication between the second chip of the substrate 1801 and the second chip of the further substrate 1802. It is to be noted that the respective interconnects may also provide a board-level communication from multiple chips of one substrate to multiple chips of another substrate.

During operation, EM waves are to be emitted for the first short range wireless interconnect and further EM waves are to be emitted for the second short range wireless interconnect, which cause interference with each other. The substrate 1801 may include a structure 1815 (i.e. a metamaterial) that is configured to exhibit effective negative permeability within the space between the first antenna 1811 and the second antenna 1812. The structure may form a surface within the space between the substrate 1801 and the further substrate 1802 for an established short range wireless interconnection of the first short range wireless interconnect and the second short range wireless interconnect. The formed surface may mimic boundary conditions of a GMC by not allowing electric fields, at least partially, to pass from one side of the surface to the other side of the surface. In particular normal components of the electric fields with respect to the surface are not allowed to pass from incident side to the other side.

The structure 1815 may exemplarily be an AMC and further details for the structure are provided within this disclosure. The structure 1815 may accordingly include a unit cell array of engineered materials including a plurality of unit cells disposed as an array. Each unit cell may be modelled as forming a surface at a boundary of the unit cell extending from the plane of the unit cell perpendicularly, which the surface may exhibit effective negative permeability. In this illustration, assuming each unit cell includes a ground plane along x-y plane, and a metal plane at x-y plane, an invisible three dimensional wall is provided, defined by the formed surfaces.

In some aspects, the first antenna 1811 may be surrounded by the structure 1815 at a plane along x-y axis ("x-y plane"). In other words, the structure 1815 may encircle the first antenna 1811 at x-y plane. As the first antenna 1811 is configured to communicate with the first antenna 1821 of the further substrate 1802, the encirclement may reduce interference at x-y axis.

Naturally, orientation and size of the formed surface(s) are dependent to the properties of the structure 1815 and some examples are provided in this disclosure for an AMC structure. Exemplarily, the structure 1815 may form one or more surfaces within the space, that are depicted as "formed surface(s)" in the illustration. The formed surface(s) may be at x-y plane (i.e. boundary conditions of GMC at a surface lying at x-y plane).

Figure 19A:
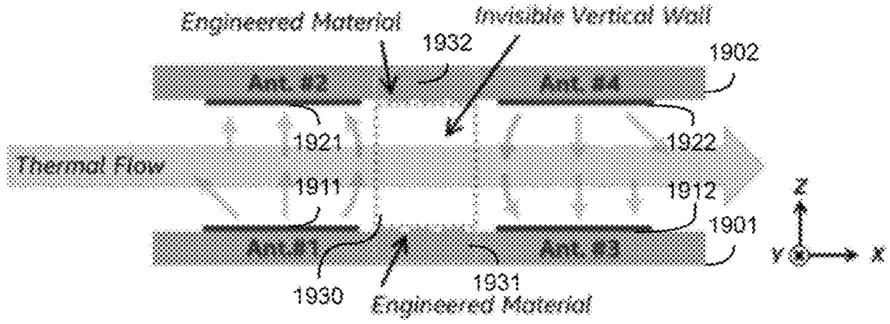
FIGS. 19A-B shows an exemplary implementation with an artificial magnetic conductor (AMC) structure for wireless chip-to-chip communication.

FIG. 19A shows an exemplary implementation with an AMC structure for wireless chip-to-chip communication, which may be suitable for multi-chip systems provided in this disclosure. A first substrate 1901 may include, at a surface, a first antenna 1911 and a second antenna 1912 spaced from the first antenna 1911. A second substrate 1902 may include, at a surface facing the surface of the first substrate 1901, a first antenna 1921 and a second antenna 1922 spaced from the first antenna 1921. The first antenna 1911 of the first substrate 1901 may form a first short range wireless interconnect with the first antenna 1921 of the second substrate 1902. The second antenna 1912 of the first substrate 1901 may form a second short range wireless interconnect with the second antenna 1922 of the second substrate 1902.

Exemplarily, the antennas provided herein may be capacitive couplers. Accordingly, the first antenna 1911 and the first antenna 1921 may be configured to perform data communication through capacitive coupling. Similarly, the second antenna 1912 and the second antenna 1922 may be configured to perform data communication through capacitive coupling. The configuration of the antennas may include alignment of the respective antennas at x-y plane for forming wireless interconnects, with a distance in-between along the space between the first substrate 1901 and the second substrate 1902. The space further provides thermal cooling via cooling material between the substrates, which may be air or cooling fluid, which is depicted as thermal flow.

In this illustrative example, when the first antenna 1911 of the first substrate 1901 radiates, EM waves do not only leak to the adjacent second antenna 1912 of the first substrate 1901, but also leaks to the second antenna 1922 of the second substrate 1902. If an AMC structure is placed on both up and down PCB/package substrates, the interference from the first antenna 1911 of the first substrate 1901 to the second antenna 1912 of the first substrate 1901, and the second antenna 1922 of the second substrate 1902 can be blocked by "an invisible vertical wall" which was created from two AMC structures.

A first AMC structure 1931 is provided between the first antenna 1911 and the second antenna 1912 of the first substrate 1901. The first AMC structure 1931 may form AMC surface(s) within the space. A second AMC structure 1932 is provided between the first antenna 1921 and the second antenna 1922 of the second substrate 1902. The second AMC structure 1932 may form further AMC surface (s) within the space. An AMC surface is designed to mimic the behavior of a GMC by reflecting electromagnetic waves in a specific frequency range. The specific frequency range includes the frequency of communication signals which the first short range wireless interconnect and/or the second short range wireless interconnect carry.

Through the formed AMC surfaces within the space, a "so called" invisible vertical wall 1930 is formed between the first AMC structure 1931 and the second AMC structure within the space which does not allow electric fields to pass from right hand side to the left-hand side in this illustration and vice versa. In other words, the formed AMC surfaces may cancel electric fields of EM waves normal to the formed AMC surfaces, at least partially (i.e. normal component incident to the formed surfaces), emitted by the first antenna 1911 of the first substrate 1901 or the first antenna 1921 of the second substrate 1902. Similarly, the formed AMC surfaces may cancel electric fields of EM waves normal to the formed AMC surfaces, at least partially (i.e. normal component incident to the formed surfaces), emitted by the second antenna 1912 of the first substrate 1901 or the second antenna 1922 of the second substrate 1901.

Figure 19B:
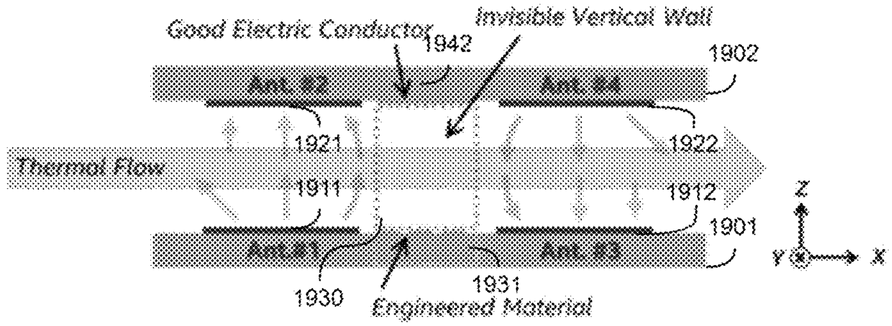

FIG. 19B shows an exemplary implementation with an AMC structure for wireless chip-to-chip communication, analogous to FIG. 19A. The FIG. 19B includes all the aspects provided with respect to FIG. 19A, except the presence of the second AMC structure on the second substrate 1902. Instead, a good electric conductor 1942 is provided between the first antenna 1921 of the second substrate 1902 and the second antenna 1922 of the second substrate 1902. The good electric conductor 1942 may be facing the first AMC structure 1931. The dimensions of the good electric conductor 1942 at x-y plane may match the dimensions of the AMC structure at x-y plane.

In a local volume of an antenna, angle between electric and magnetic fields changes with a propagation distance within the proximity of the antenna, i.e. near-field or radiating near-field region. Fields are not parallel or perpendicular to the substrates. Thus, both vertically and horizontally-oriented electric fields can exist, although vertically-oriented electric field is still dominant for capacitive coupling. In some situation, mix of good electric conductor (GEC) and AMC structure implemented with engineered material block the fields more effectively.

For these aspects, the characteristics of a GEC depends on operational frequency (i.e. frequency of communication signals carried by interconnects). For <<1 GHZ, 1×10^6 S/m can be considered as a good electric conductivity while >1×10^7 S/m can be considered as a good electric conductivity above 1 GHZ.

Figure 20:
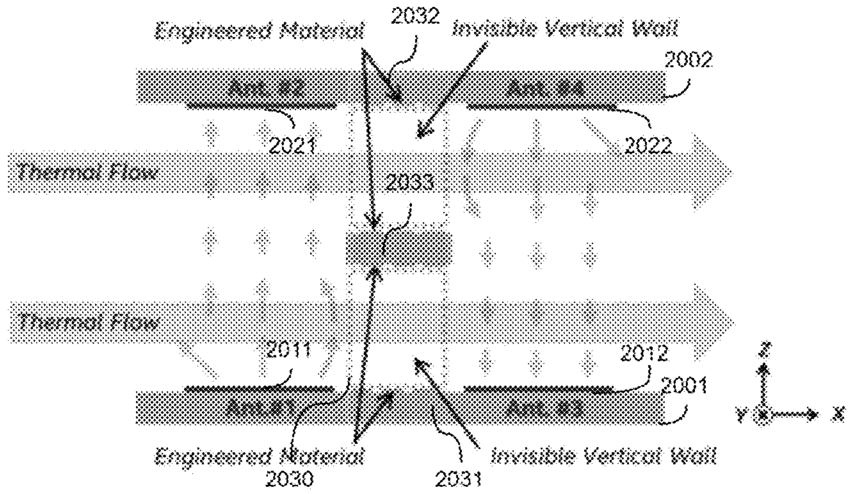
FIG. 20 shows an exemplary implementation with an AMC structure for wireless chip-to-chip communication.

FIG. 20 shows an exemplary implementation with an AMC structure for wireless chip-to-chip communication, analogous to FIG. 19A and FIG. 19B. A first substrate 2001 may include, at a surface, a first antenna 2011 and a second antenna 2012 spaced from the first antenna 2011. A second substrate 2002 may include, at a surface facing the surface of the first substrate 2001, a first antenna 2021 and a second antenna 2022 spaced from the first antenna 2021. The first antenna 2011 of the first substrate 2001 may form a first short range wireless interconnect with the first antenna 2021 of the second substrate 2002. The second antenna 2012 of the first substrate 2001 may form a second short range wireless interconnect with the second antenna 2022 of the second substrate 2002.

Exemplarily, the antennas provided herein may be capacitive couplers. Accordingly, the first antenna 2011 and the first antenna 2021 may be configured to perform data communication through capacitive coupling. Similarly, the second antenna 2012 and the second antenna 2022 may be configured to perform data communication through capacitive coupling. The configuration of the antennas may include alignment of the respective antennas at x-y plane for forming wireless interconnects, with a distance in-between along the space between the first substrate 2001 and the second substrate 2002. The space further provides thermal cooling via cooling material between the substrates, which may be air or cooling fluid, which is depicted as thermal flow.

A first AMC structure 2031 is provided between the first antenna 2011 and the second antenna 2012 of the first substrate 2001. The first AMC structure 2031 may form invisible vertical wall within the space. A second AMC structure 2032 is provided between the first antenna 2021 and the second antenna 2022 of the second substrate 2002. The second AMC structure 2032 may form further invisible vertical wall within the space. An AMC surface is designed to mimic the behavior of a GMC by reflecting electromagnetic waves in a specific frequency range. The specific frequency range includes the frequency of communication signals which the first short range wireless interconnect and/or the second short range wireless interconnect carry.

Typically, the height of formed invisible vertical wall (i.e. z-axis) is less than a quarter wavelength for a single AMC structure (on x-y plane). Considering AMC structures on both substrates, as exemplified in FIG. 19A, such facing AMC structures support less than half-wavelength height of formed invisible vertical wall at z axis. When there is a larger separation distance between the first substrate 2001 and the second substrate 2002, further intermediate structures 2033 can be inserted between within the space. These further intermediate structures 2033 may be provided more than once, depending on the distance between the first substrate 2001 and the second substrate 2002. Further intermediate structures 2003 may include AMC structures or good electric conductors. They may be provided with small cylindrical supporting structures on the corners of the block, as illustrated in FIG. 20 a single block case.

Structures provided in this disclosure that may form a surface exhibiting effective negative permeability (e.g. AMC structures) may be provided via employment of an array of unit cells of engineered materials, which are basic repeating elements of the metamaterial. Each unit cell is typically composed of a number of metallic elements or weak resonant structure that are arranged in a specific pattern to produce the desired electromagnetic response. The unit cells are typically arranged in a periodic fashion. The unit cells may operate by resonating at specific frequencies, which may allow them to absorb or reflect electromagnetic waves. The specific resonant frequencies of the unit cells depend on their size, shape, and material properties.

Figure 21A:
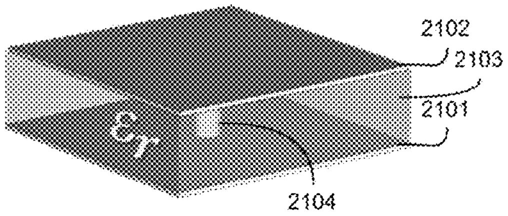
FIG. 21A shows an exemplary structure of a unit cell of a unit cell array for an AMC structure.

FIG. 21A shows an exemplary structure of a unit cell of a unit cell array for an AMC structure. The unit cell may include a ground plane 2101 (e.g. a plate connectable to a ground), a metallic plate 2102 parallel to the ground plane 2101 and separated with a gap filled with dielectric material 2103. The area size of the ground plane 2101 is generally larger than the arca size of the metallic plate 2102, although not depicted as such in the figure. The metallic plate 2102 may have particular shape, such as rectangular, square, spiral, elliptical, etc. Generally, homogeneous material property is preferred for engineered materials in unit cells and miniaturization techniques are explored for engineered-material unit cell. A popular structure of miniaturized unit cells has an added via 2104 which is centered on the parallel plates and also loaded the plates with dielectric material having a relative permittivity (or dielectric constant, Er).

Figure 21B:
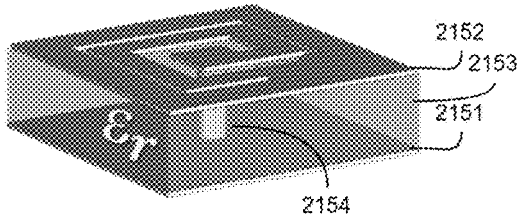
FIG. 21B shows an exemplary structure of a unit cell of a unit cell array for an AMC structure.

FIG. 21B shows an exemplary structure of a unit cell of a unit cell array for an AMC structure. The unit cell may include a ground plane 2151 (e.g. a plate connectable to a ground), a metallic plate 2152 parallel to the ground plane 2151 and separated with a gap filled with dielectric material 2153. The area size of the ground plane 2151 is generally larger than the area size of the metallic plate 2152, although not depicted as such in the figure. The metallic plate 2152 may have particular shape, such as rectangular, square, spiral, elliptical, etc. Generally, homogeneous material property is preferred for engineered materials in unit cells and miniaturization techniques are explored for engineered-material unit cell. A popular structure of miniaturized unit cells has an added via 2154 which is centered on the parallel plates and also loaded the plates with dielectric material having a relative permittivity (or dielectric constant, ¿r). In this particular example, size of the unit cell with the center via is to be reduced through a spiral stub as the metallic plate which is connected to the center via 2154.

Figure 22A:
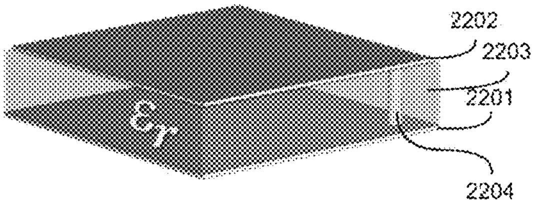
FIG. 22A shows an exemplary structure of a unit cell of a unit cell array.

FIG. 22A shows an exemplary structure of a unit cell of a unit cell array in accordance with various aspects of this disclosure. The unit cell may include a ground plane 2201 (e.g. a plate connectable to a ground), a metallic plate 2202 parallel to the ground plane 2201 and separated with a gap filled with dielectric material 2203. The area size of the ground plane 2201 is generally larger than the area size of the metallic plate 2202, although not depicted as such in the figure. The metallic plate 2202 may have particular shape, such as rectangular, square, elliptical, spiral, etc.

Centered vias have been generally in use due to the preferred isotropic material property in x-y plane. However, when the size of the unit cell becomes 1/10 or smaller than the wavelength, the property of the small unit cell shows quasi-isotropic material property.

The unit cell further includes an offset via 2204 to maximize the miniaturization of the unit cell. The offset via 2204 connecting the metallic plate 2202 to the ground plane 2201 connects to the metallic plate 2202 at an edge of the metallic plate 2202 instead of its center. In some aspects, the offset via 2204 may connect to the metallic plate at a corner of the metallic plate 2202.

Figure 22B:
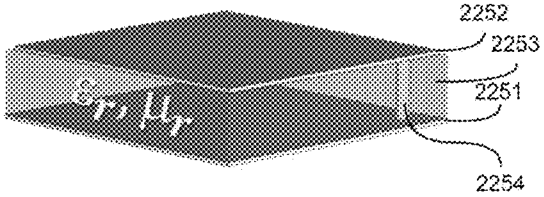
FIG. 22B shows an exemplary structure of a unit cell of a unit cell array.

FIG. 22B shows an exemplary structure of a unit cell of a unit cell array in accordance with various aspects of this disclosure. The unit cell may include a ground plane 2251 (e.g. a plate connectable to a ground), a metallic plate 2252 parallel to the ground plane 2251 and separated with a gap filled with magneto-dielectric material 2253. The area size of the ground plane 2251 is generally larger than the area size of the metallic plate 2252, although not depicted as such in the figure. The metallic plate 2252 may have particular shape, such as rectangular, square, elliptical, etc. The unit cell further includes an offset via 2254 to maximize the miniaturization of the unit cell. The offset via 2254 connecting the metallic plate 2252 to the ground plane 2251 connects to the metallic plate 2252 at an edge of the metallic plate 2252 (instead of its center). In some aspects, the offset via 2254 may connect to the metallic plate at a corner of the metallic plate 2252.

The volume of the unit cell with off-centered via can further be scaled down by factor of $1\sqrt{\varepsilon_{r2}\mu_{r2}}$ when magneto-dielectric material 2253 is used between the metallic plate 2252 and the ground plane 2251. Here, $\varepsilon_{r2}$ denotes the relative permittivity of the magneto-dielectric material 2253 and $\mu_{r2}$ denotes the relative permeability of the magneto-dielectric material 2253. Both relative permittivity and relative permeability would be greater than 1. It is to be noted that, magneto-dielectric material loading can be applied to other known unit-cell structures of engineered material, as well.

Figure 23:
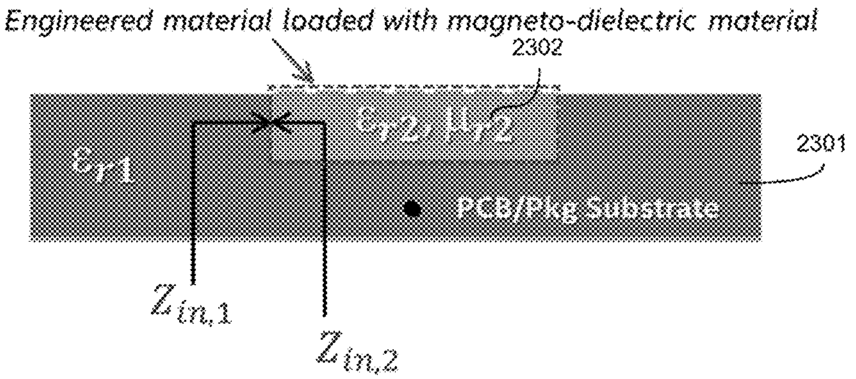
FIG. 23 shows an exemplary illustration of an AMC structure disposed on a substrate.

FIG. 23 shows an exemplary illustration of an AMC structure disposed on a substrate. The substrate 2301 may be any type of substrates provided herein (e.g. PCB, package) for aspects. The AMC structure 2302 may, in particular, include an array of unit cell including a plurality of unit cells as provided with respect to FIG. 22B, for some aspects provided herein. It is accordingly possible to further reduce the volume of a unit cell with magneto-dielectric material. However, unless the ratio between relative permittivity and relative permeability is properly selected, there can be significant reflections due to ultra-wideband impedance mismatch at the boundaries between the substrate (e.g. PCB or package) 2301 and the magneto-dielectric substrate of AMC structure 2302.

The input impedance of the substrate (e.g. PCB or package) 2301 (Zin, 1) should be equal to input impedance of the substrate of AMC structure (Zin, 2) 2302 to avoid the reflections at the boundaries. Then, the condition to match impedance may be found as below, $\varepsilon_{r1}$ representing the relative permittivity of the substrate 2301 and $\varepsilon_{r2}$ and $\mu_{r2}$ representing the relative permittivity and the relative permeability of the magneto-dielectric substrate of the AMC structure 2302 respectively:

$$\frac{1}{\varepsilon_{r1}} = \frac{\mu_{r2}}{\varepsilon_{r2}}$$

For example, if relative permittivity of the substrate 2301 is 4, relative permittivity and relative permeability of the magneto-dielectric substrate of the AMC structure 2302 are 2 and 8, respectively. The expected volume scaling factor of AMC structure 2302 is 4. Equivalent miniaturization can be achieved by only using a dielectric material with relative permittivity=16, but it often ends up with narrower operational bandwidth (stop-band bandwidth) of the AMC structure 2302 due to high-Q nature of the high relative-permittivity material. In this sense, the preferred miniaturization approach would be using the substrate 2301 (PCB or package) with a lower relative permittivity to maximize scale-down factor as well as operational bandwidth of the AMC structure 2302 with magneto-dielectric substrate.

Operational bandwidth (stop-band bandwidth) of the unit cell provided in accordance with FIGS. 22A-B can be further increased by placing a resistor between each neighboring unit cells in the array. The resistors add insertion loss, however the added insertion loss may be a trade-off relationship between bandwidth and loss. In addition, it is to be noted that a larger-size unit cell has a larger operational bandwidth than a smaller same-configuration unit cell. Either discreate or embedded resistors can be considered for the resistive loading. Resistors with a constant value or distributed values can be used, depending on near-field distribution from antennas/couplers.

Figure 24:
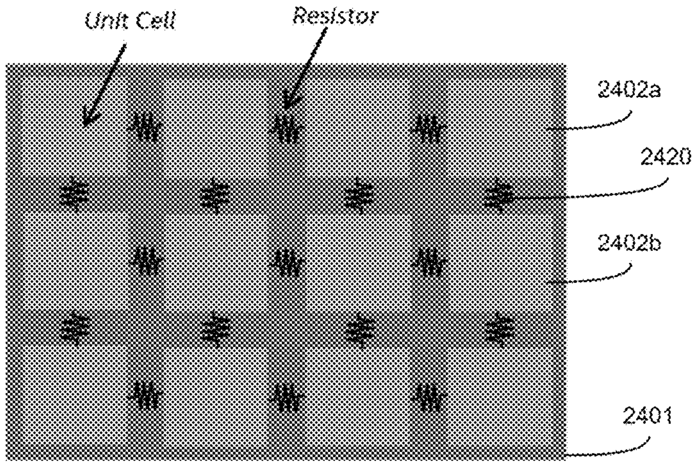
FIG. 24 shows an example of a 2D illustration of a unit cell array of an AMC structure.

FIG. 24 shows an example of a 2D illustration of a unit cell array of an AMC structure. The illustration is from a perspective which metallic plates of each unit cells are seen from above. The illustrated array includes 12 unit cells, for illustration purposes, 4 unit cell at each row. The array includes a ground plane 2401 that is a common ground plane for all unit cells. The array further includes a metallic plate parallel to the ground plane 2401 for each unit cell, which the unit cells are provided in a periodic manner. Each metallic plate is connected to a neighboring metallic plate via a resistive element, such as a resistor, a resistive structure, etc. Exemplarily, the metallic plate 2402*a* of a first unit cell is connected to the metallic plate 2402*b* of a second unit cell via a resistive element 2420. It is to be noted that the array may include any type of exemplary unit cells provided in this disclosure, in a manner that the unit cells are arranged according to desired conditions.

Figure 25:
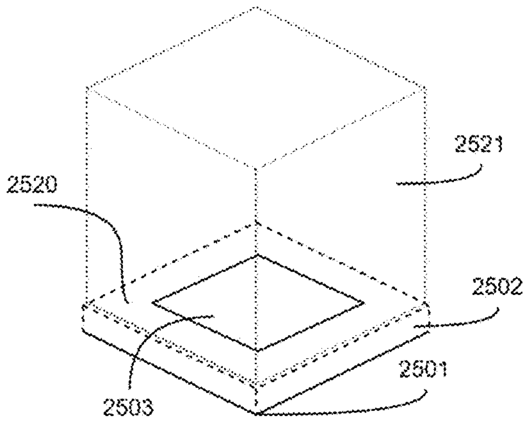
FIG. 25 shows an example of a 3D illustration of a unit cell of an AMC structure.

FIG. 25 shows an example of a 3D illustration of a unit cell of an AMC structure. The unit cell includes a ground plane 2501, a metallic plane 2503 having smaller area size than the ground plane 2501 and provided in parallel to the ground plane 2501, and a dielectric material 2502 (or magneto-dielectric material) provided between the ground plane 2501 and the metallic plane 2503. The figure further illustrates a model of GMC boundary conditions in 2520 in arranged operating frequency and in an operational AMC structure, representative of surfaces formed by the unit cell. The cubical volume 2521 represents invisible vertical wall created from the GMC boundary conditions.

Figure 26:
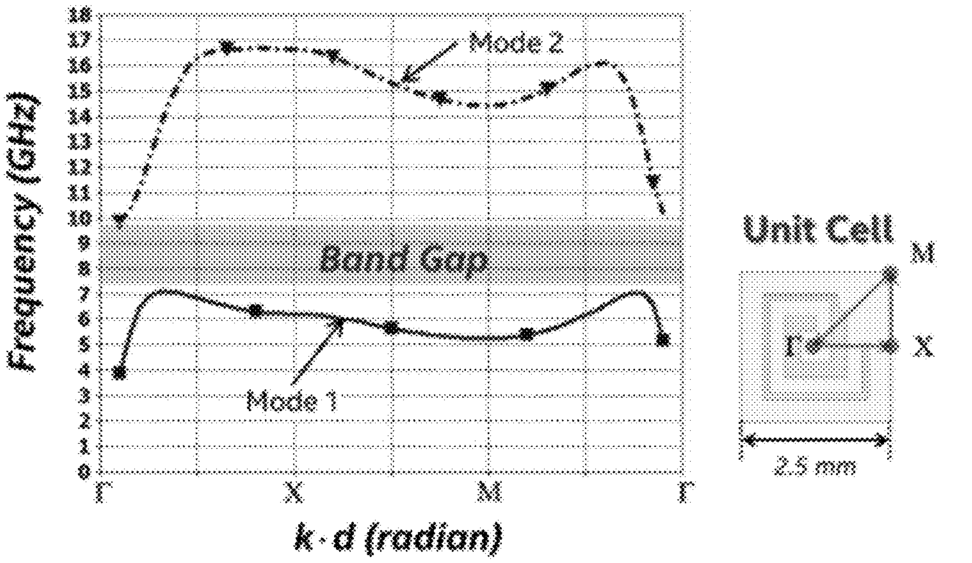
FIG. 26 shows an exemplary dispersion-diagram analysis.

FIG. 26 shows an exemplary dispersion-diagram analysis using Floquet boundary conditions and Eigen-mode analysis in accordance with some aspects. The analysis is made for an infinite array of unit cells with a spiral stub (FIG. 21B). The top metal-plate area of the unit cell is 2.5×2.5 $mm^2$. Dielectric constant of the unit-cell substrate is 3.6. Note the "k" is the wavenumber ($2\pi/\lambda$) and "d" is the distance between unit cells. For this particular example, "d"=2.5 mm. The AMC structure creates a band gap (stop-band) between 7.5 and 9.5 GHZ and between supported modes 1 and 2. Dispersion-diagram analysis is computationally efficient approach to design a unit cell for a given stop-band bandwidth specification, although truncation error due to finite size of unit-cell array needs to be compensated in realistic designs.

Figure 27:
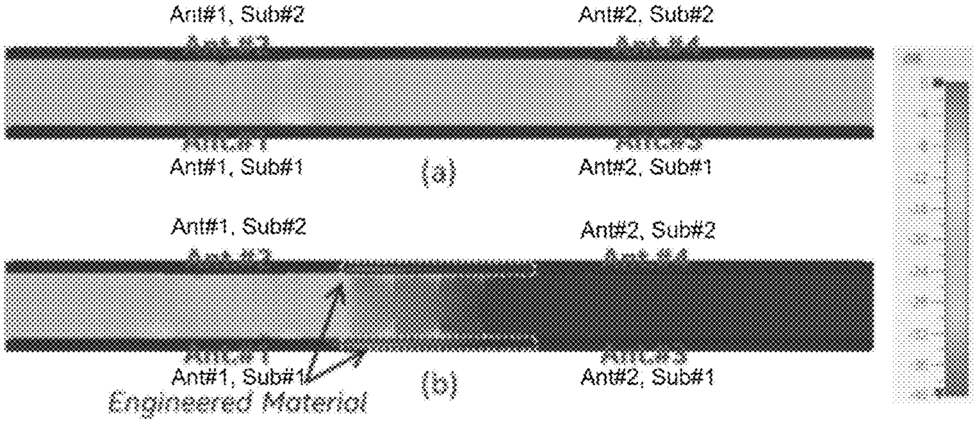
FIG. 27 shows an output of an exemplary simulation associated with the apparatus.

FIG. 27 shows an output of an exemplary simulation associated with the apparatus provided in FIG. 19A. FIG. 27 shows in (a) simulated power flow distribution of wireless interconnects at 8.6 GHZ when the first antenna of the first substrate (Ant #1, Sub #1) is excited to get coupled to Ant #2 of Sub #2, when there is no AMC structure provided. Brighter color in gray scale indicates stronger power flow. It is to be seen that the excitation of the Ant #1, Sub #1 causes interference power flow to Ant #2, Sub #1 and Ant #2, Sub #2. On the other, FIG. 27 shows in (b) the simulated power flow distribution at the same conditions, except the AMC structures are provided in between in FIG. 19A. It is to be seen that the excitation of the Ant #1, Sub #1 does not cause power flow to the Ant #2, Sub #1 and Ant #2, Sub #2 (i.e. power coupling to these antennas are effectively blocked).

Figure 28A:
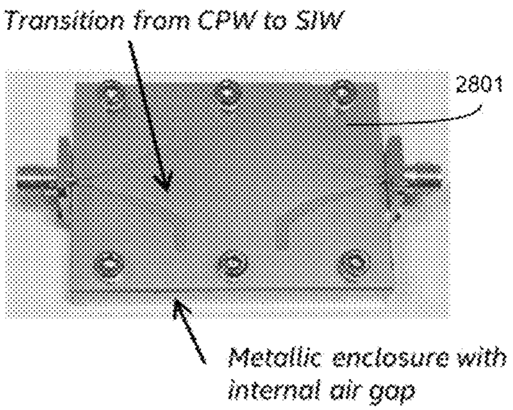
FIGS. 28A-B show images of an exemplary test design.
Figure 28B:
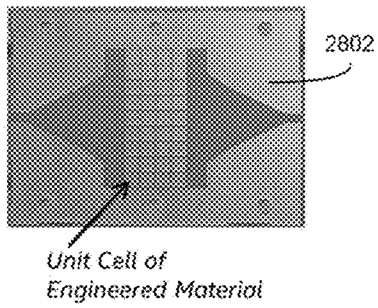

FIGS. 28A-B show images of an exemplary test design. A tapered substrate-integrated waveguide (SIW) on top-side PCB 2801 was designed to provide broadband impedance match between the SMA connector and the array of the unit cell with offset via on back-side PCB 2802. The SIW also make vertically-polarized electrical fields propagate toward the unit-cell array. A metal block with internal air gap was attached to the backside of PCB. The area of the unit cell is 3.125×3.125 mm2. Dielectric constant of the unit-cell substrate is 3.6.

Figure 29A:
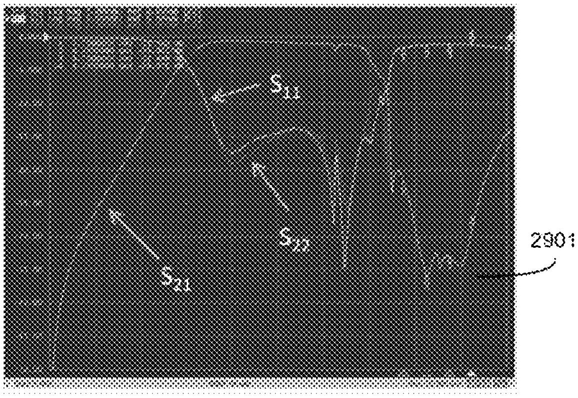
FIGS. 29A-B show exemplary measurement results associated with the exemplary test design.
Figure 29B:
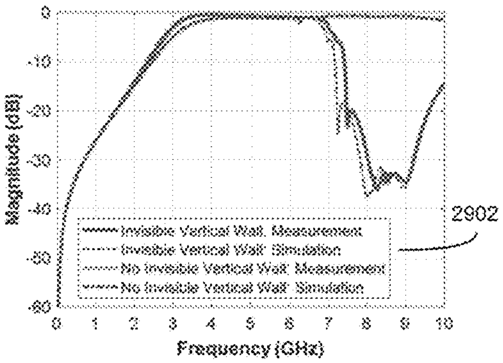

FIGS. 29A-B show exemplary measurement results associated with the exemplary test design introduced with respect to FIG. 28A-B. Measurement screen capture of S-parameters (2901) and comparison curves of through measurements (2902) are particularly shown herein. The unit-cell array blocks the incident electric fields effectively in the targeted frequency range of 7.75-9.25 GHz. Compared to that, the other test design without unit-cell array shows continuous wideband (4-9.25 GHZ) without stop-band. According to the results, the unit-cell array blocks the incident electric fields effectively, as desired.

Figure 30A:
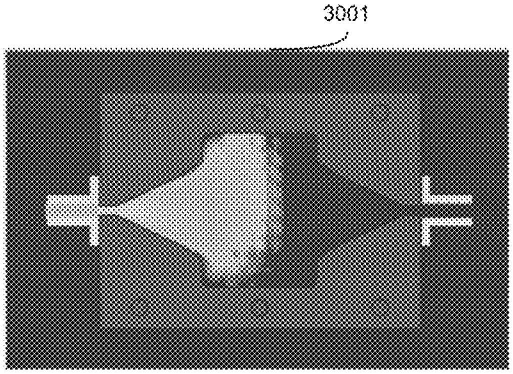
FIGS. 30A-B illustrates exemplary simulation results.
Figure 30B:
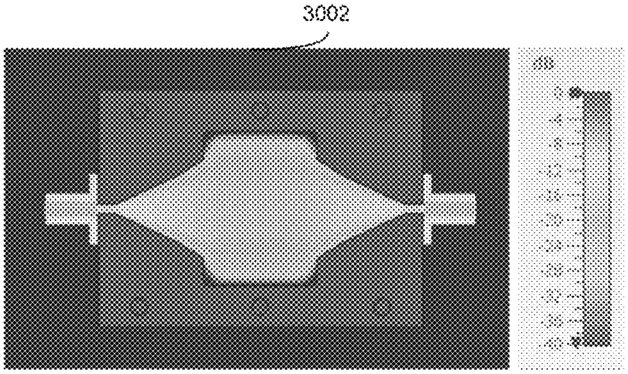

FIGS. 30A-B illustrates exemplary simulation results. The simulation results are for power-flow distribution inside the air gap in the metallic enclosure at 8 GHZ for with an AMC structure (3001) and without an AMC structure (3002) for the exemplary test design. Brighter color in gray scale means stronger power flow.

Although many aspects provided herein with an exemplary application to wireless chip-to-chip communication technology, these aspects may also be applicable to similar structures including multiple antennas or couplers disposed on facing substrates and forming short range wireless interconnects for data communication. One particular example may include connectors, as they also require EMI/RFI shielding and/or improve isolation between electromagnetic radiators.

Traditionally, a connector (e.g. universal serial bus (USB) connector) may be a plug or a receptacle. A plug may be plugged into a receptacle on a device to establish connection via the connector by forming wired interconnections. Generally, dust can build up over time inside the plug and/or receptacle affecting the performance of the wired interconnects. In addition, wired interconnect approach may not be a water-proof configuration. It may be desirable to provide a connector at which the plug and the receptacle can exchange data over short range wireless interconnects. Exemplary AMC and similar structures provided herein may be used to block EM wave leakage which may also bring potential security breach challenge.

Figure 31:
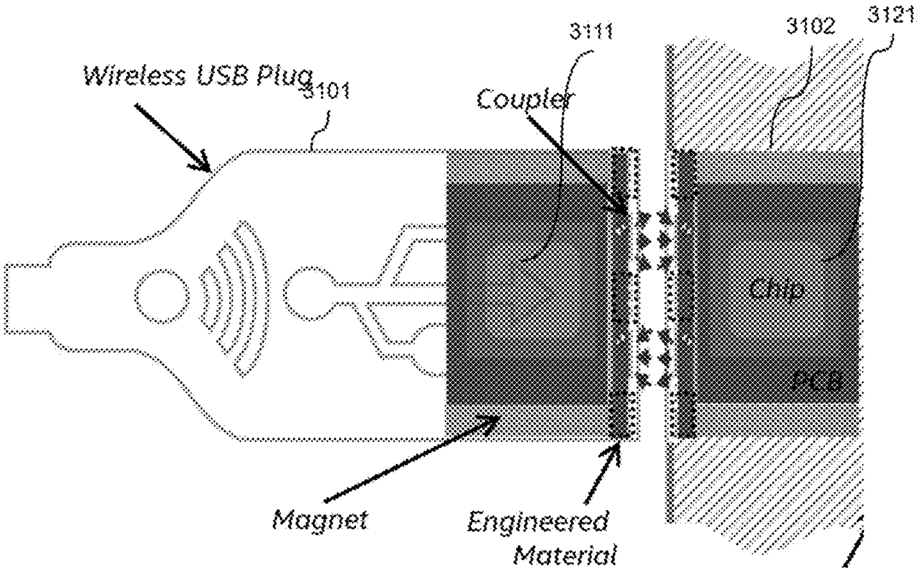
FIG. 31 shows an example of a connector.

FIG. 31 shows an example of a connector. The connector includes a plug 3101, depicted as Wireless USB Plug, and a receptacle 3102. The plug 3101 may include a cable (not shown) carrying data between a data communication circuit (e.g. a chip) 3111 and other end of the cable. The data communication circuit 3111 may be configured to interface between the cable and couplers. The connector may further include one or more capacitive couplers provided at a first surface of a first substrate, such as PCB or package, which the one or more capacitive couplers may be coupled to the data communication circuit 3111 transmitting and/or receiving data from one or more further capacitive couplers of the receptacle 3102. The one or more further capacitive couplers of the receptacle 3102 may be provided on a surface of a second substrate of the receptacle. The surface of the second substrate of the receptacle 3102 may face the surface of the first substrate of the plug 3101. The receptacle 3102 may further include a further data communication circuit 3121 coupled to the one or more further capacitive couplers, which the further data communication circuit 3121 may interface between the one or more further capacitive couplers and a device including the receptacle 3102.

Data communication circuits may be wireless circuitry as provided with respect to FIG. 9. The plug 3101 may further include a fastener configured to fasten the first substrate to a housing external to the plug 3101, such as a housing of the device including the receptacle 3102. With the fastening, the one or more capacitive couplers of the plug 3101 face with the one or more further capacitive couplers of the receptacle 3102. Exemplarily, a first coupler and a second coupler of the first substrate faces a first external coupler and a second external coupler of a second substrate respectively. Accordingly, they may establish first short range wireless interconnect and second short range wireless interconnect respectively. The fastener may, via fastening the plug 3101 to the housing including the receptacle 3102, hold the first substrate of the plug 3101 and the second substrate of the receptacle 3102 spaced apart with a space. The fastener may include a magnet.

The plug 3101 may further include at least one AMC structure to reduce and/or block EM leakage from wireless interconnects to the outside of the space. In various aspects, one or more AMC structures may encircle each capacitive coupler of the plug 3101 at the first surface. In some aspects, one or more AMC structures may encircle the first surface of the first substrate. In some aspects, at least one AMC structure may be provided between a first coupler of the one or more capacitive couplers of the plug 3101 and a second coupler of the one or more capacitive couplers of the plug 3101 to reduce interference. The device including the receptacle 3102 may exemplarily be a computer.

Figure 32:
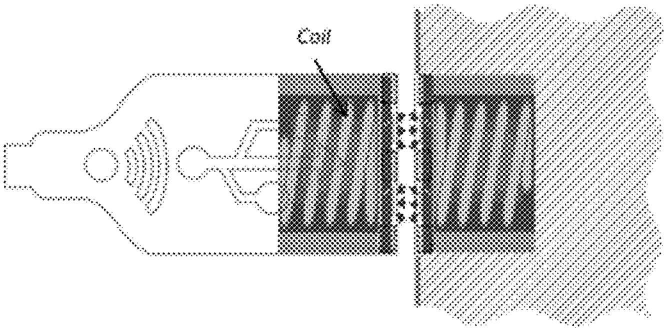
FIG. 32 shows an example of a connector.

FIG. 32 shows an example of a connector. The connector provided in FIG. 32 is identical with the connector of FIG. 31, with a difference that each of the plug and the receptacle includes an inductive coupler (e.g. a coil shaped inductive coupler). Accordingly, the plug and the receptacle are configured for wireless power transfer. Because of direct wireless coupling in proximity of couplers and only a single frequency is needed for wireless power transfer, a very low frequency (<<1 GHZ) can be considered. However, the maximum wirelessly-transferable power would be limited due to the small form factor of plug and receptacle. Assuming one-way wireless power transfer from the receptacle to the plug, the inductive coupler size does not need to be the same for the plug (power receive) and the receptacle (power transmit). The inductive coupler of the receptacle can have a larger size or a greater number of turns to provide more efficient wireless power transfer, than that of inductive coupler in the plug (footprint is very limited).

Figure 33:
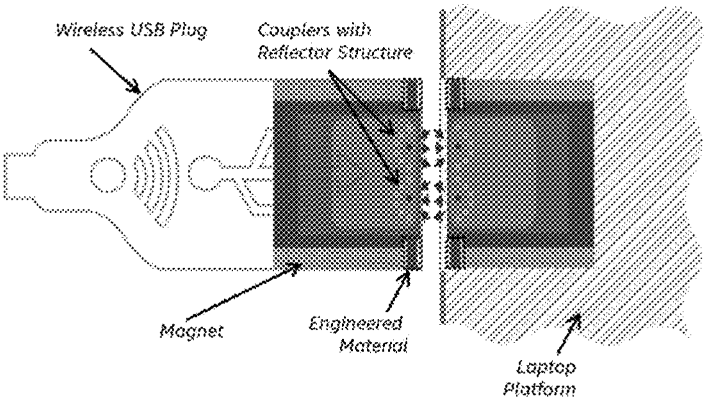
FIG. 33 shows an example of a connector.

FIG. 33 shows an example of a connector. The connector provided in FIG. 33 may be identical with one of the connectors provided with respect to FIG. 31 or FIG. 32. Additionally, or alternatively, the first substrate may be the package substrate of the data communication circuit and the one or more capacitive couplers could be embedded in the first substrate (e.g. silicon or glass) by using the through silicon/glass vias (TSV/TGV) while the AMC structures could still be implemented in PCB/package. In particular, high isolation (>35-dB) between capacitive couplers can be achieved without the engineered materials. In this case, at least one reflector structure may be provided encircling the capacitive couplers to provide isolation, at least partially. The encircling may be behind the one or more capacitive couplers to obtain the high isolation by using a global search optimization algorithm, such as genetic algorithm, particle swarm, and covariance matrix adaptation evolution strategy (CMA ES). Of course, one-way wireless power transfer can be considered as well with additional inductive coupler similar to FIG. 32.

The detailed description refers to the accompanying drawings that show, by way of illustration, specific details and aspects of this disclosure in which the disclosure may be practiced. Other aspects may be utilized and structural, logical, and electrical changes may be made without departing from the scope of the disclosure. The various aspects of this disclosure are not necessarily mutually exclusive, as some aspects of this disclosure can be combined with one or more other aspects of this disclosure to form new aspects.

The word "exemplary" is used herein to mean "serving as an example, instance, or illustration". Any aspect of the disclosure or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term “a plurality” may be understood to include a numerical quantity greater than or equal to two (e.g., two, three, four, five, [ . . . ], etc.).

The phrase “at least one of” with regard to a group of elements may be used herein to mean at least one element from the group consisting of the elements. For example, the phrase “at least one of” with regard to a group of elements may be used herein to mean a selection of: one of the listed elements, a plurality of one of the listed elements, a plurality of individual listed elements, or a plurality of a multiple of individual listed elements.

The words “plural” and “multiple” in the description and in the claims expressly refer to a quantity greater than one. Accordingly, any phrases explicitly invoking the aforementioned words (e.g., “plural [elements]”, “multiple [elements] ”) referring to a quantity of elements expressly refers to more than one of the said elements. The terms “group (of)”, “set (of)”, “collection (of)”, “series (of)”, “sequence (of)”, “grouping (of)”, etc., and the like in the description and in the claims, if any, refer to a quantity equal to or greater than one, i.e., one or more. The terms “proper subset”, “reduced subset”, and “lesser subset” refer to a subset of a set that is not equal to the set, illustratively, referring to a subset of a set that contains less elements than the set.

The term “data” as used herein may be understood to include information in any suitable analog or digital form, e.g., provided as a file, a portion of a file, a set of files, a signal or stream, a portion of a signal or stream, a set of signals or streams, and the like. Further, the term “data” may also be used to mean a reference to information, e.g., in form of a pointer. The term “data”, however, is not limited to the aforementioned examples and may take various forms and represent any information as understood in the art.

The terms “processor” or “controller” as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, “memory” is understood as a computer-readable medium in which data or information can be stored for retrieval. References to “memory” included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term “software” refers to any type of executable instruction, including firmware.

Unless explicitly specified, the term “transmit” encompasses both direct (point-to-point) and indirect transmission (via one or more intermediary points). Similarly, the term “receive” encompasses both direct and indirect reception. Furthermore, the terms “transmit,” “receive,” “communicate,” and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term “communicate” encompasses one or both of transmitting and receiving, i.e., unidirectional or bidirectional communication in one or both of the incoming and outgoing directions. The term “calculate” encompasses both ‘direct’ calculations via a mathematical expression/formula/relationship and ‘indirect’ calculations via lookup or hash tables and other array indexing or searching operations.

The word “exemplary” is used herein to mean “serving as an example, instance, or illustration”. Any aspect or design described herein as “exemplary” is not necessarily to be construed as preferred or advantageous over other aspects or designs.

Throughout the drawings, it should be noted that like reference numbers are used to depict the same or similar elements, features, and structures, unless otherwise noted.

The phrase “at least one” and “one or more” may be understood to include a numerical quantity greater than or equal to one (e.g., one, two, three, four, [ . . . ], etc.). The phrase “at least one of” with regard to a group of elements may be used herein to mean at least one element from the group consisting of the elements. For example, the phrase “at least one of” with regard to a group of elements may be used herein to mean a selection of: one of the listed elements, a plurality of one of the listed elements, a plurality of individual listed elements, or a plurality of a multiple of individual listed elements.

The words “plural” and “multiple” in the description and in the claims expressly refer to a quantity greater than one. Accordingly, any phrases explicitly invoking the aforementioned words (e.g., “plural [elements]”, “multiple [elements]”) referring to a quantity of elements expressly refers to more than one of the said elements. For instance, the phrase “a plurality” may be understood to include a numerical quantity greater than or equal to two (e.g., two, three, four, five, [ . . . ], etc.).

The phrases “group (of)”, “set (of)”, “collection (of)”, “series (of)”, “sequence (of)”, “grouping (of)”, etc., in the description and in the claims, if any, refer to a quantity equal to or greater than one, i.e., one or more. The terms “proper subset”, “reduced subset”, and “lesser subset” refer to a subset of a set that is not equal to the set, illustratively, referring to a subset of a set that contains less elements than the set.

Further, spatially relative terms, such as “beneath,” “below,” “lower,” “above.” “upper” and the like, may be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The term "semiconductor substrate" is defined to mean any construction including semiconductor material, for example, a silicon substrate with or without an epitaxial layer, a silicon-on-insulator substrate containing a buried insulator layer, or a substrate with a silicon germanium layer. The term "integrated circuits" as used herein refers to electronic circuits having multiple individual circuit elements, such as transistors, diodes, resistors, capacitors, inductors, and other active and passive semiconductor devices.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in computer readable storage medium prior to its receipt by the receiving component and the receiving component may retrieve the signal from the storage medium. Further, a "value" that is "indicative of" some quantity, state, or parameter may be physically embodied as a digital signal, an analog signal, or stored bits that encode or otherwise communicate the value.

As used herein, a signal may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal. For example, a transmit signal may be considered as referring to the transmit signal in baseband, intermediate, and radio frequencies.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As utilized herein, terms "module", "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D Points, among others, or any combination thereof. Registers, shift registers, processor registers, data buffers, among others, are also embraced herein by the term memory. The term "software" refers to any type of executable instruction, including firmware.

The term "antenna" or "antenna structure", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

The term "operatively connected" as used herein may describe a connection between two elements, such that a first element operates or functions using as input the output of a second element. According to an aspect of the disclosure, "operatively connected" may describe an electrically conductive connection. That is, two elements that are operatively connected as described herein may be electrically conductively connected such that an electric charge may travel from the first element to the second element.

In example 1, the subject matter includes an apparatus that may include: a substrate including: a first antenna configured to form a first short range wireless interconnection with a first antenna of a further substrate; a second antenna spaced apart from the first antenna, the second antenna is configured to form a second short range wireless interconnection with a second antenna of the further substrate; a metamaterial configured to form a surface with effective negative permeability the space is formed within a space between a surface of the substrate and a surface of the further substrate for an established short range wireless interconnection of the first short range wireless interconnection and the second short range wireless interconnection.

In example 2, the subject matter of example 1, can optionally include that the structure includes a unit cell array of engineered material may include a plurality of unit cells; can optionally include that each cell includes a ground plane with a surface area of a first size, a metal plane parallel to the ground plane with a surface area of a second size smaller than the first size, and the metal plane facing the surface of the second substrate and a unit cell gap may include dielectric material provided between the ground plane and the metal plane.

In example 3, the subject matter of example 2, can optionally include that at least one of the first size, the second size, or the properties of the dielectric material is based on frequency of RF communication signals carried by the first short range wireless interconnection.

In example 4, the subject matter of example 3, can optionally include that at least one of the first size, the second size, or the properties of the dielectric material is based on frequency of RF communication signals carried by the second short range wireless interconnection.

In example 5, the subject matter of any one of examples 2 to 4, can optionally include that each unit cell further includes a via connecting an edge of the metal plane with the ground plane.

In example 6, the subject matter of any one of examples 2 to 5, can optionally include that a resistive element is coupled between the metal plane of a first unit cell of the unit cell array and the metal plane of a second unit cell of the unit cell array neighboring the first unit cell.

In example 7, the subject matter of any one of examples 2 to 6, can optionally include that the unit cell gap material is magneto-dielectric material and the input impedances seen at a boundary between the unit cell array and the substrate are matched with each other.

In example 8, the subject matter of example 7, can optionally include that at least one of relative permittivity or relative permeability of the magneto-dielectric material is based on relative permittivity of the substrate.

In example 9, the subject matter of any one of examples 1 to 8, can optionally include that the formed surface includes an electromagnetic metasurface within the space between the first antenna and the second antenna, can optionally include that the electromagnetic metasurface is for a frequency band may include a frequency of RF communication signals transmitted over at least one of the first short range wireless interconnection or the second short range wireless interconnection.

In example 10, the subject matter of example 9, can optionally include that the electromagnetic metasurface reflects electric fields induced for at least one of the first short range wireless interconnection or the second short range wireless interconnection.

In example 11, the subject matter of any one of examples 1 to 10, can optionally include that the first antenna and/or the second antenna is surrounded by the structure at the surface.

In example 12, the subject matter of any one of examples 1 to 11, can optionally include that each of the first antenna and the second antenna includes an inductive coupler, a capacitive coupler, or an antenna.

In example 13, the subject matter of any one of examples 1 to 12, can optionally include that the substrate includes: a first chip may include the first antenna and a first RF circuit coupled to the first antenna; a second chip may include the second antenna and a second RF circuit coupled to the second antenna.

In example 14, the subject matter of example 13, further may include the further substrate may include the first antenna of the further substrate and the second antenna of the further substrate that is spaced apart from the first antenna of the further substrate.

In example 15, the subject matter of any one of examples 13 or 14, can optionally include that the structure is a first structure; can optionally include that the further substrate includes a second structure provided between the first antenna of the further substrate and the second antenna the further substrate.

In example 16, the subject matter of any one of examples 13 to 15, can optionally include that the further substrate structure includes a second structure may include a further unit cell array of engineered material may include a plurality of unit cells.

In example 17, the subject matter of any one of examples 13 to 15, can optionally include that the further substrate structure includes a good electric conductor having a conductivity more than 1×10^6 S/m.

In example 18, the subject matter of any one of examples 13 to 17, further may include an intermediate structure provided within the space between the first structure and the second structure, the intermediate structure may include at least one of a third structure configured to form a surface with effective negative permeability or a further good electric conductor.

In example 19, the subject matter of any one of examples 13 to 18, can optionally include that the further substrate includes a third chip and a third RF circuit coupled to the first antenna of the second substrate, and a fourth chip and a fourth RF circuit coupled to the second antenna of the second substrate.

In example 20, the subject matter of example 19 can optionally include that the first short range wireless interconnection is to provide communication between the first chip and the third chip and the second short range wireless interconnection is to provide communication between the second chip and the fourth chip.

In example 21, the subject matter of any one of examples 1 to 12, can optionally include that the apparatus is configured to be fastened to a housing of an external device may include the further substrate, such that the first antenna of the substrate and the second antenna of the substrate facing the first antenna of the further substrate and the second antenna of the further substrate respectively.

In example 22, the subject matter of example 21, can optionally include that the first short range wireless interconnection and the second short range wireless interconnection are configured for a wireless data communication.

In example 23, the subject matter of example 21 or example 22, can optionally include that each the first antenna and the second antenna include a capacitive coupler.

In example 24, the subject matter of example 23, further may include: a coil shaped inductive coupler configured for wireless power transfer between the apparatus and a further coil shaped inductive coupler of the external device; can optionally include that sizes of the coil shaped inductive coupler and the further coil shaped inductive coupler are different.

In example 25, the subject matter of example 24, further may include: data communication circuitry; can optionally include that the coil shaped inductive coupler partially surrounds at least the data communication circuitry, the first antenna, and the second antenna.

In example 26, the subject matter of any one of examples 21 to 25, can optionally include that the substrate includes a reflector structure partially surrounding the first antenna and the second antenna.

In example 27, the subject matter of any one of examples 21 to 26, can optionally include that the substrate includes a packaging substrate and a PCB substrate; can optionally include that the first antenna and the second antenna are embedded in the packaging substrate via one of through silicon vias or through glass vias; can optionally include that the structure is provided on the PCB substrate.

In example 28, the subject matter of any one of examples 21 to 27, can optionally include that the apparatus is a universal serial bus (USB) connector apparatus.

In example 29, the subject matter of any one of examples 1 to 28, can optionally include that the apparatus further includes a metallic enclosure or a plastic enclosure enclosing at least the substrate.

In example 30, the subject matter of any one of examples 1 to 29, can optionally include that each of the substrate and the further substrate is one of a printed circuit board (PCB) substrate or a packaging substrate.

In example 31, an apparatus may include: a first substrate may include at a first surface: a first chip and a first antenna coupled to the first chip; a second chip and a second antenna coupled to the first chip, can optionally include that the second antenna is spaced apart from the first antenna; a second substrate may include a second surface facing the first surface with a space between the first surface and the second surface; a structure provided on the first surface between the first antenna and the second antenna, the structure is configured to form a surface with effective negative permeability within the space.

In example 32, the subject matter of example 31, can optionally include that the second substrate includes at the second surface: a third chip and a third antenna coupled to the third chip configured to communicate with the first chip via the third antenna and the first antenna; a fourth chip and a fourth antenna coupled to the fourth chip configured to communicate with the second chip via the fourth antenna and the second antenna, can optionally include that the fourth antenna is spaced apart from the third antenna.

In example 33, the subject matter of example 32, may further include any aspects provided in this disclosure, especially aspects in examples 1 to 29.

In example 33, a connector may include: a first substrate may include, at a first surface: a first coupler and a second coupler; a fastener configured to fasten the first substrate to a housing external to the connector, such that the first coupler and the second coupler of the first substrate faces a first external coupler and a second external coupler of a second substrate respectively, the second substrate is external to the connector and spaced apart with a space; at least one artificial magnetic conductor (AMC) structure disposed on the first surface, the AMC structure is configured to form an electromagnetic metasurface between the first substrate and the second substrate within the space.

In example 34, the subject matter of example 33, may further include any aspects provided in this disclosure, especially aspects in examples 1 to 29.

What is claimed is:

1. An apparatus comprising:

a substrate comprising:

a first antenna configured to form a first short range wireless interconnection with a first antenna of a further substrate, the further substrate external to the substrate;

a second antenna spaced apart from the first antenna, the antenna is configured to form a second short range wireless interconnection with a second antenna of the further substrate;

a metamaterial configured to form a surface with effective negative permeability, the surface is formed within a space between a surface of the substrate and a surface of the further substrate for an established short range wireless interconnection of the first short range wireless interconnection and the second short range wireless interconnection.

2. The apparatus of claim 1, wherein the metamaterial comprises a unit cell array of engineered material comprising a plurality of unit cells;

wherein each cell comprises a ground plane with a surface area of a first size, a metal plane parallel to the ground plane with a surface area of a second size smaller than the first size, and the metal plane facing the surface of the second substrate and a unit cell gap comprising dielectric material provided between the ground plane and the metal plane.

3. The apparatus of claim 2,
wherein at least one of the first size, the second size, or the properties of the dielectric material is based on frequency of RF communication signals carried by the first short range wireless interconnection.
4. The apparatus of claim 3,
wherein at least one of the first size, the second size, or the properties of the dielectric material is based on frequency of RF communication signals carried by the second short range wireless interconnection.
5. The apparatus of claim 2,
wherein each unit cell further comprises a via connecting to an edge of the metal plane and to the ground plane.
6. The apparatus of claim 2,
wherein a resistive element is coupled between the metal plane of a first unit cell of the unit cell array and the metal plane of a second unit cell of the unit cell array neighboring the first unit cell.
7. The apparatus of claim 2,
wherein the unit cell gap material is magneto-dielectric material and the input impedances at a boundary between the unit cell array and the substrate are matched with each other.
8. The apparatus of claim 7,
wherein at least one of relative permittivity or relative permeability of the magneto-dielectric material is based on relative permittivity of the substrate.
9. The apparatus of claim 1,
wherein the formed surface comprises an electromagnetic metasurface within the space between the first antenna and the second antenna, wherein the electromagnetic metasurface is for a frequency band comprising a frequency of RF communication signals transmitted over at least one of the first short range wireless interconnection or the second short range wireless interconnection.
10. The apparatus of claim 9,
wherein the electromagnetic metasurface reflects electric fields induced for at least one of the first short range wireless interconnection or the second short range wireless interconnection.
11. The apparatus of claim 1,
wherein the first antenna and/or the second antenna is surrounded by the metamaterial at the surface.
12. The apparatus of claim 1,
wherein each of the first antenna and the second antenna comprises an inductive coupler, a capacitive coupler, or an antenna.
13. The apparatus of claim 1,
wherein the substrate comprises:
a first chip comprising the first antenna and a first RF circuit coupled to the first antenna;
a second chip comprising the second antenna and a second RF circuit coupled to the second antenna.
14. The apparatus of claim 13,
further comprising the further substrate comprising the first antenna of the further substrate and the second antenna of the further substrate that is spaced apart from the first antenna of the further substrate.
15. The apparatus of claim 13,
wherein the metamaterial is a first metamaterial;
wherein the further substrate comprises a second structure provided between the first antenna of the further substrate and the second antenna the further substrate.
16. The apparatus of claim 13,
wherein the further substrate structure comprises a second metamaterial comprising a further unit cell array of engineered material comprising a plurality of unit cells.
17. The apparatus of claim 13,
wherein the further substrate structure comprises an electric conductor having a conductivity more than 1×10ˆ6 S/m.
18. The apparatus of claim 13,
further comprising an intermediate structure provided within the space between the first metamaterial and the second structure, the intermediate structure comprising at least one of a third metamaterial configured to form a surface with effective negative permeability or a further good electric conductor.
19. The apparatus of claim 13,
wherein the further substrate comprises a third chip and a third RF circuit coupled to the first antenna of the second substrate, and a fourth chip and a fourth RF circuit coupled to the second antenna of the second substrate.
20. The apparatus of claim 19
wherein the first short range wireless interconnection is configured to provide communication between the first chip and the third chip and the second short range wireless interconnection is configured to provide communication between the second chip and the fourth chip.
21. The apparatus of claim 1,
wherein the apparatus is configured to be fastened to a housing of an external device comprising the further substrate, such that the first antenna of the substrate and the second antenna of the substrate facing the first antenna of the further substrate and the second antenna of the further substrate respectively.
22. An apparatus comprising:
a first substrate comprising at a first surface:
a first chip and a first antenna coupled to the first chip;
a second chip and a second antenna coupled to the first chip, wherein the second antenna is spaced apart from the first antenna;
a second substrate comprising a second surface facing the first surface with a space between the first surface and the second surface;
a metamaterial provided on the first surface between the first antenna and the second antenna, the metamaterial is configured to form a surface with effective negative permeability within the space.
23. The apparatus of claim 22,
wherein the second substrate comprises at the second surface:
a third chip and a third antenna coupled to the third chip configured to communicate with the first chip via the third antenna and the first antenna;
a fourth chip and a fourth antenna coupled to the fourth chip configured to communicate with the second chip via the fourth antenna and the second antenna, wherein the fourth antenna is spaced apart from the third antenna.

* * * * *